United States Patent
Clune et al.

(10) Patent No.: US 7,438,847 B2
(45) Date of Patent: Oct. 21, 2008

(54) DELIVERING RESIN FOR FORMING FASTENER PRODUCTS

(75) Inventors: William P. Clune, Northwood, NH (US); Robert Thomas, Amesbury, MA (US); Howard A. Kingsford, Amherst, NH (US)

(73) Assignee: Velcro Industries B.V., Curacao (NL)

( * ) Notice: Subject to any disclaimer, the term of this patent is extended or adjusted under 35 U.S.C. 154(b) by 986 days.

(21) Appl. No.: 10/803,682

(22) Filed: Mar. 18, 2004

(65) Prior Publication Data

US 2005/0206030 A1    Sep. 22, 2005

(51) Int. Cl.
*B29C 41/00*    (2006.01)
(52) U.S. Cl. .................................. 264/638; 425/331
(58) Field of Classification Search ................ 264/638; 425/331
See application file for complete search history.

(56) References Cited

U.S. PATENT DOCUMENTS

| | | | |
|---|---|---|---|
| 3,752,619 A | 8/1973 | Menzin et al. | |
| 3,758,657 A | 9/1973 | Menzin et al. | |
| 3,762,000 A | 10/1973 | Menzin et al. | |
| 4,279,579 A * | 7/1981 | Froeschke | 425/6 |
| 4,963,084 A * | 10/1990 | Froeschke | 425/331 |
| 4,976,907 A * | 12/1990 | Brotz | 264/140 |
| 5,198,233 A * | 3/1993 | Kaiser | 425/6 |
| 5,401,938 A * | 3/1995 | Froeschke et al. | 219/602 |
| 5,770,235 A * | 6/1998 | Baumann et al. | 425/8 |
| 5,945,131 A | 8/1999 | Harvey et al. | |
| 6,482,286 B1 | 11/2002 | Harvey et al. | |
| 6,627,133 B1 * | 9/2003 | Tuma | 264/167 |
| 6,660,121 B2 | 12/2003 | Harvey et al. | |
| 6,692,674 B1 | 2/2004 | Kurtz et al. | |
| 2001/0018110 A1 | 8/2001 | Tuman et al. | |
| 2003/0021991 A1 * | 1/2003 | Sugayoshi et al. | 428/372 |
| 2003/0085485 A1 | 5/2003 | Seidel et al. | |
| 2003/0085492 A1 | 5/2003 | Shulte | |
| 2003/0087059 A1 | 5/2003 | Jackson et al. | |
| 2003/0087098 A1 | 5/2003 | Eaton et al. | |
| 2003/0104746 A1 | 6/2003 | Menzies et al. | |
| 2003/0119404 A1 | 6/2003 | Belau et al. | |

FOREIGN PATENT DOCUMENTS

| | | |
|---|---|---|
| WO | WO 00/50229 | 8/2000 |
| WO | WO00/50229 | 8/2000 |

* cited by examiner

*Primary Examiner*—Russell J. Kemmerle, III
(74) *Attorney, Agent, or Firm*—Fish & Richardson P.C.

(57) ABSTRACT

Methods and machines for making fastener products having molded projections or other molded features carried on a surface feature transferring resin in discrete doses through an orifice defined in an outer surface of a rotating die wheel.

61 Claims, 16 Drawing Sheets

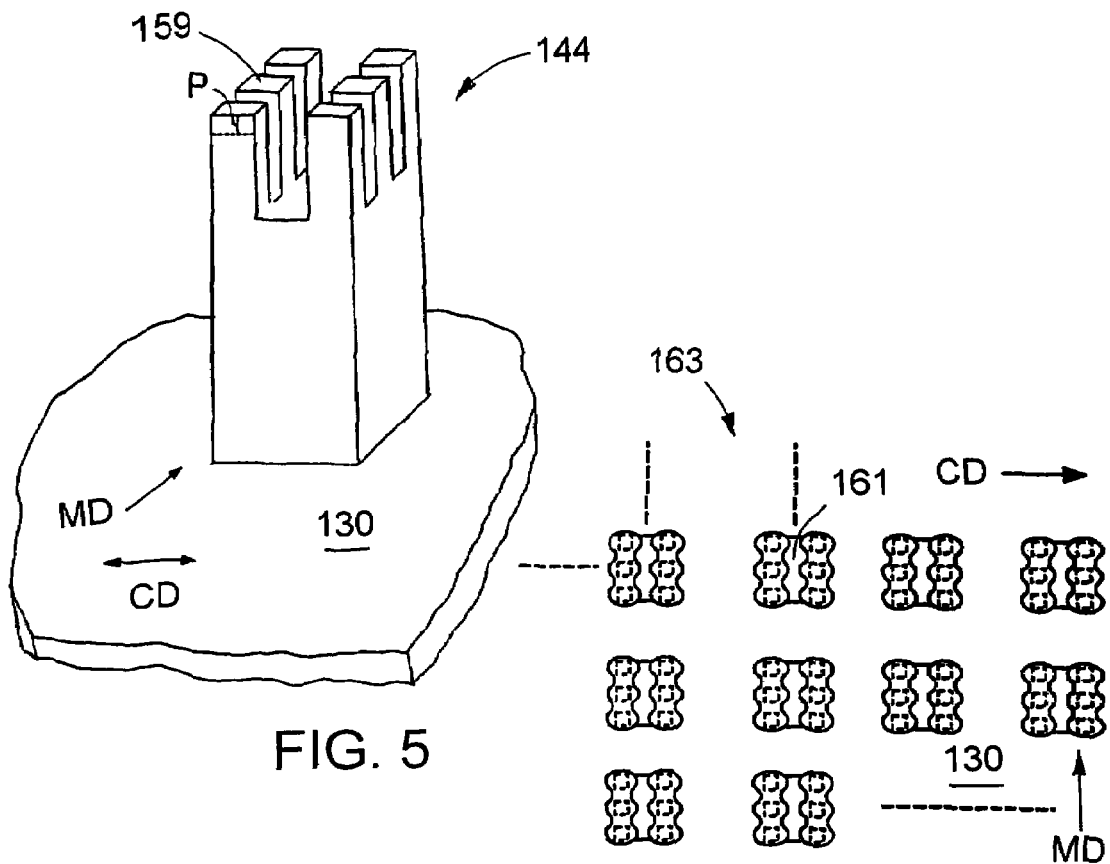
FIG. 5
FIG. 5A
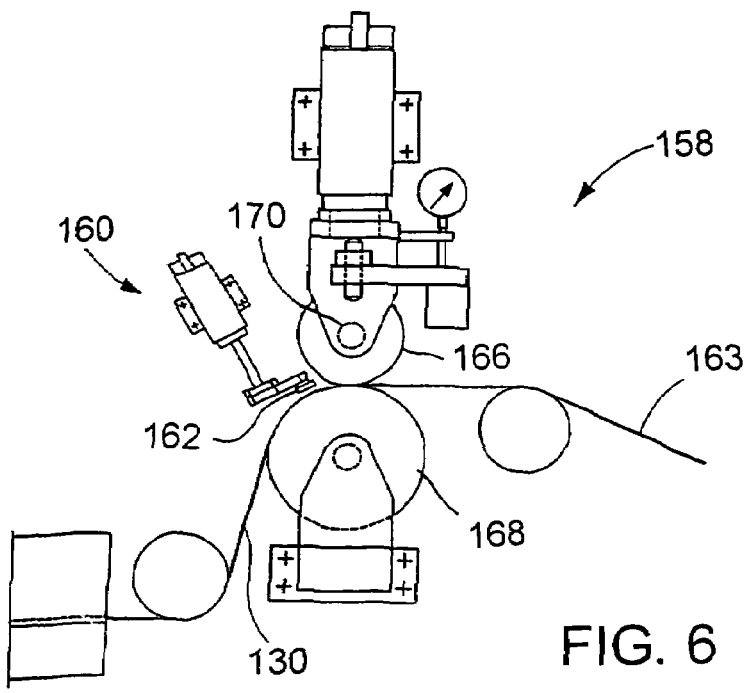
FIG. 6

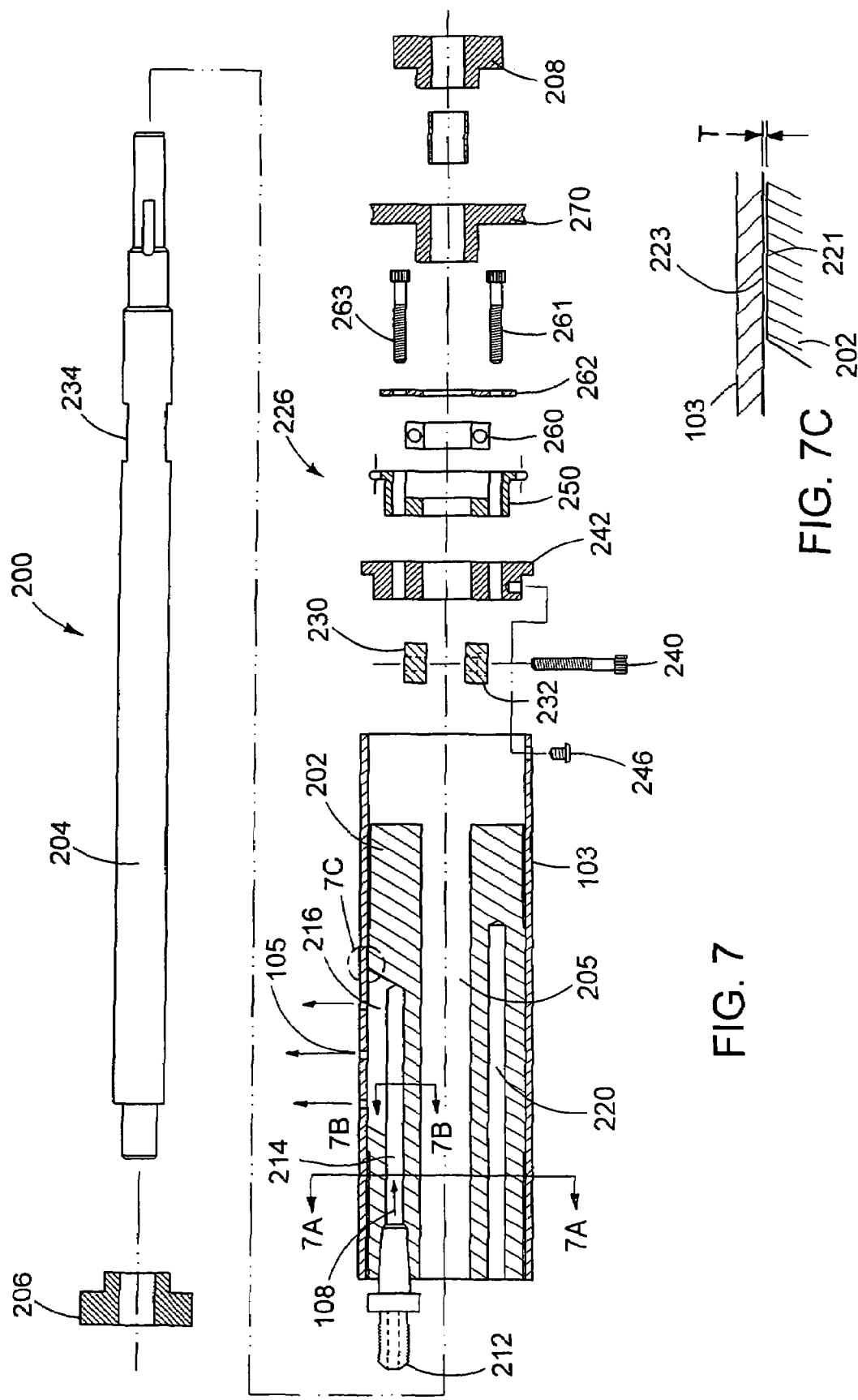

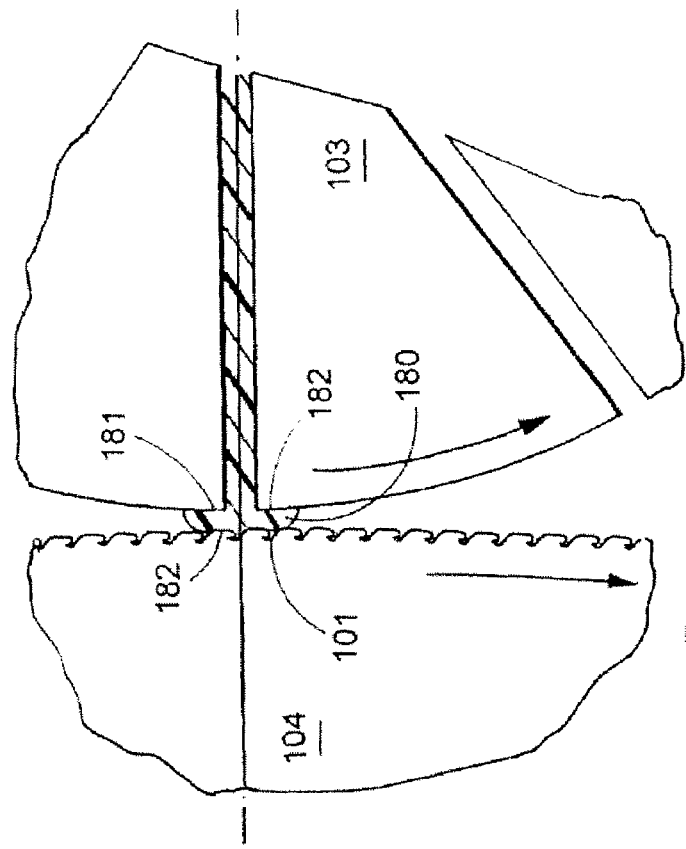
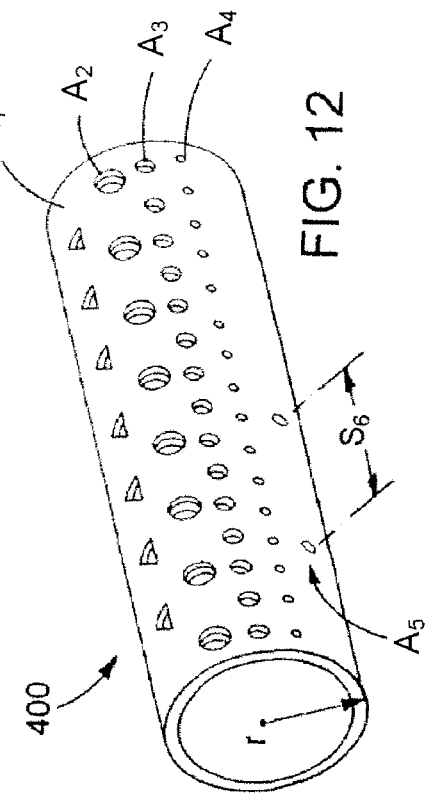
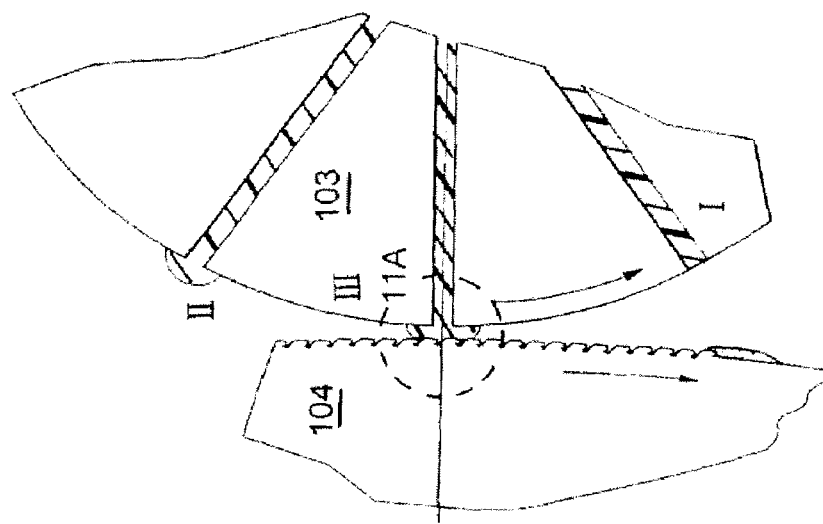

DELIVERING RESIN FOR FORMING FASTENER PRODUCTS

TECHNICAL FIELD

This invention relates to methods and machines for making fastener products.

BACKGROUND

Fastener products, such as hook components of hook-and-loop fasteners, or other projections for releasable engagement into a cooperating material, are often manufactured by a continuous molding method employing a cylindrical mold roll which has fastener-shaped mold cavities formed in its periphery. Often the mold roll is formed of an axially compressed stack of ring-form mold plates. In operation, molten polymer from an extruder is introduced into a pressure zone in which the molten polymer is forced under high pressure into the fastener cavities of the mold roll, to mold fastener elements, e.g., hooks, or stems from which fastener elements are later formed, integrally with a base layer. In some cases the pressure zone is a nip formed by a mold roll and an adjacent pressure roll. In other configurations the pressure zone is formed between a conforming stationary pressure head and a mold roll.

For some applications, it is desirable that the fastener elements of the product be arranged only in discrete areas, and that the pattern of such areas be of a specific configuration.

Further improvements in methods and machines for making fastener products are desirable. It is desirable that the improved methods be readily and efficiently adaptable with current manufacturing methods and equipment, thus eliminating or greatly reducing the need for large expenditures in new equipment.

SUMMARY

Several aspects of the invention feature new methods and machines for making fastener products having molded projections or other molded features carried on a surface. The new methods and machines feature transferring resin in discrete doses, or charges through an orifice defined in an outer surface of a rotating die wheel.

One aspect of the invention features an apparatus for making fastener products having an array of male fastener elements formed of resin. The apparatus includes a mold roll that defines an array of cavities extending inwardly from an outer surface thereof. A counter-rotating pressure roll is positioned adjacent the mold roll to define a pressure nip. A rotating die wheel defines an extrusion orifice in an outer surface thereof and the die wheel is positioned so as to transfer extruded resin into the pressure nip in discrete regions corresponding to doses of resin extruded through the orifice. The discrete regions of resin are laminated to a carrier sheet and pressed into multiple cavities of the mold roll in the pressure nip to form at least the stems of the fastener elements. The base of the resin is formed on the surface of the mold roll and interconnects the fastener element stems.

Another aspect of the invention features a method of making fastener products having an array of male fastener elements formed of resin. The method includes providing a mold roll that defines an array of cavities extending inwardly from an outer surface thereof. The mold roll is positioned adjacent to a counter-rotating pressure roll to define a pressure nip. Moldable resin is extruded in discrete doses through an orifice defined in an outer surface of a rotating die wheel. The extruded resin is transferred into the pressure nip in such a manner that the resin is transferred into the nip in discrete regions corresponding to the doses of extruded resin. The resin is laminated to a carrier sheet and the regions of resin are pressed into multiple cavities of the mold roll in the pressure nip to form at least the stems of the fastener elements. The base of the resin is formed on the surface of the mold roll and interconnects the fastener element stems. Stripping the resin from the mold roll surface on the carrier sheet frees the fastener product.

In several implementations, the resin is transferred as a series of discrete regions spaced apart according to revolutions of the die wheel, or the resin is transferred as a multiple number of regions per revolution of the die wheel. In some embodiments, the die wheel defines multiple extrusion orifices and the extrusion orifices are spaced apart along a rotational axis of the die wheel. In some implementations, the extrusion orifices are spaced apart about a circumference of the die wheel, such that multiple discrete regions of resin are transferred per revolution of the die wheel.

In certain implementations, the resin is extruded at such a rate that causes adjacent doses of resin to merge on the carrier sheet. In another implementation, adjacent doses merge under nip pressure to form the base as a contiguous layer of resin.

In specific embodiments, multiple extrusion orifices are arranged adjacent one another in a grouping, such that doses of resin from the orifices in the grouping are transferred into the pressure nip in a pattern of an overall shape determined by a shape of the grouping of orifices in the die wheel. In another specific embodiment, the adjacent doses of resin in the transferred pattern merge to fill the overall pattern shape with a contiguous layer of resin.

In some implementations, the orifice extends through the die wheel between two openings at the outer surface of the die wheel, the die wheel rotating adjacent a source of pressurized molten resin cyclically exposed to the orifice, and the source of pressurized molten resin comprises an extrusion shoe forming a seal against the die wheel. The two openings can be, for example, disposed on opposite sides of the die wheel, and the two openings can rotate within parallel planes spaced apart along a rotational axis of the die wheel, the orifice extending at an acute angle to the rotational axis. In another implementation, the orifice extends between an opening at an outer surface of the die wheel and an opening at an inner surface of the die wheel, the die wheel defining therein a reservoir containing pressurized, molten resin.

In some embodiments, the die wheel includes a rotating sleeve disposed about a rotationally stationary cylinder defining an outer opening in hydraulic communication with the die wheel reservoir, the die wheel rotating to cyclically align the orifice and outer opening, and the outer opening of the cylinder includes a longitudinal slot.

In preferred implementations, the method further includes adjusting a rotational orientation of the cylinder to position an extrusion orientation of the die wheel. The resin can be, for example, carried into the pressure nip on the carrier sheet. In a specific implementation, the carrier sheet is trained about the rotating die wheel, and the resin is wiped onto the carrier sheet from the outer surface of the rotating die wheel. In some implementations, the carrier sheet passes through a nip defined between the die wheel and a counter-rotating roller.

In several embodiments, the resin is transferred into the pressure nip by first being transferred from the outer surface of the die wheel to the outer surface of the mold roll, and then carried into the pressure nip by rotation of the mold roll, or the resin is transferred into the pressure nip by first being transferred from the outer surface of the die wheel to an outer surface of the pressure roll, and then carried into the pressure nip by rotation of the pressure roll.

In specific implementations, the resin is laminated to the carrier sheet in the pressure nip, the carrier sheet being carried into the nip between the resin and the mold roll, pressure in the nip forcing the resin through the carrier sheet to fill the mold roll cavities.

In some implementations, the method further includes forming engageable heads on distal ends of the fastener element stems. The mold roll can, for example, include cavities that are shaped to mold the engageable heads. In some implementations, the heads are formed by deforming distal ends of the mold stems, after stripping the resin from the mold roll surface.

Another aspect of the invention features a method of making fastener products having an array of male fastener elements formed of resin. The method includes providing a mold roll that defines an array of cavities extending inwardly from an outer surface thereof. The mold roll positioned adjacent a counter-rotating pressure roll to define a pressure nip. Moldable resin is extruded as discrete doses through an orifice defined in an outer surface of a rotating die wheel, the extruding occurs at such a rate that the discrete doses at least partially merge. The resin is transferred into the pressure nip and pressed so that the at least partially merged doses of resin enter the multiple cavities of the mold roll in the pressure nip to form at least the stems of the fastener elements. A contiguous base of resin is formed on the surface of the mold roll that interconnects the fastener element stems.

Another aspect of the invention features a method of making fastener products having an array of male fastener elements formed of resin. The method includes providing a mold roll that defines an array of cavities extending inwardly from an outer surface thereof. Molded resin is extruded through an orifice defined in an outer surface of a rotatable die wheel while the die wheel is stationary (i.e., not rotating). The extruded resin is transferred into the pressure nip, and pressed into multiple cavities of the mold roll in the pressure nip to form at least the stems of the fastener elements. A base of the resin on the surface of the mold roll, the base interconnecting the fastener element stems, and the resin is laminated to a carrier sheet.

In specific implementations, the outer surface defines a plurality of orifices, producing a fastener product with discrete strips of fastener elements along a first direction upon the carrier sheet, the discrete strips being contiguous in a second direction that is perpendicular to the first direction. In another embodiment, the resin falls through a distance, for example, 0.5 to 36 inch (1.27-91.44 cm), onto the mold roll under the influence of gravity.

Another aspect of the invention features a method of making fastener products having an array of male fastener elements formed of resin. The method includes providing a mold roll that defines an array of cavities extending inwardly from an outer surface thereof. Molten resin is deposited upon the outer surface of the mold roll under substantially atmospheric pressure conditions while the mold roll rotates so that the molten resin remains substantially on the outer surface of the mold roll. The resin is transferred into the pressure nip, and optionally laminated to a carrier sheet. The resin is pressed into multiple cavities of the mold roll in the pressure nip to form at least the stems of the fastener elements, while forming a base of the resin on the surface of the mold roll, the base interconnecting the fastener element stems.

In specific implementations, the resin is transferred into the nip in discrete regions corresponding to discrete doses of extruded resin.

The new methods and machines disclosed herein are useful in making fastener products, particularly products with fastener elements arranged in only discrete areas.

It has been discovered that, under controlled conditions, applying molten resin to a moving surface that carries the resin into the forming nip, can advantageously precondition the resin for molding. The surface cooling of the resin as it is traveling into the nip, if properly controlled, can provide certain benefits while still allowing proper cavity filling. For example, some surface cooling may reduce the longitudinal orienting of polymer chains as the resin is drawn into the nip, improving longitudinal tear resistance. With moderate pre-nip cooling, some resins may be less likely to strike through to the opposite face of a carrier web, for applications in which full penetration is not desirable. This can enable the use of lighter, more open materials in such processes. When resin is transferred from a rotating die wheel directly to a mold roll or pressure roll at such a rate that adjacent doses of resin at least partially merge, particularly thin fastener products with contiguous base layers can be prepared which do not need a sheet material and which may exhibit a lower tendency for tear propagation in the production direction. Furthermore, the apparatus disclosed herein can be configured for rapid reconfiguration of the resin transfer pattern, simply by replacement or modification of the rotating die wheel.

The systems and methods described herein can allow for operating at high speeds to achieve high production rates. It is noted that the faster the speed, the less the pre-delivered resin is subjected to cooling conditions of the chilled mold roll. With other conditions the same, a lower resin viscosity is achievable upon arrival at the forming nip, which can decrease the required calender pressure of the nip from that required at slower speeds.

The systems and methods described herein can also be employed to advantage in the transfer of resin in discrete regions onto a carrier web for purposes other than the formation of fastener products. For example, discrete regions with or without fastener elements can be used advantageously to alter the stretch properties of the carrier sheet.

The details of one or more embodiments of the invention are set forth in the accompanying drawings and the description below. Other features, and advantages of the invention will be apparent from the description and drawings, and from the claims.

DESCRIPTION OF DRAWINGS

FIG. 5 is a perspective view of a castellated preform fastener element.

FIG. 5A is a top view of an array of the fastener elements formed from the preforms shown in FIG. 5, after formation of nodular heads from the castellations.

FIG. 6 is a side view of a machine for heating and modifying preform fastener elements to form functional fastener elements.

FIG. 7 is an exploded side view of an end fed rotating die wheel.

FIG. 7C is an enlarged view of area 7C shown in FIG. 7.

FIG. 11 is an enlarged cross-sectional view of a portion of the multiple-orifice wheel sleeve shown in FIG. 4 delivering molten resin to a mold roll.

FIG. 11A is an enlarged view of area 11A shown in FIG. 11.

FIG. 12 is a perspective view of an alternative rotating, multiple-orifice die wheel sleeve.

Like reference symbols in the various drawings indicate like elements.

DETAILED DESCRIPTION

Figure 1:
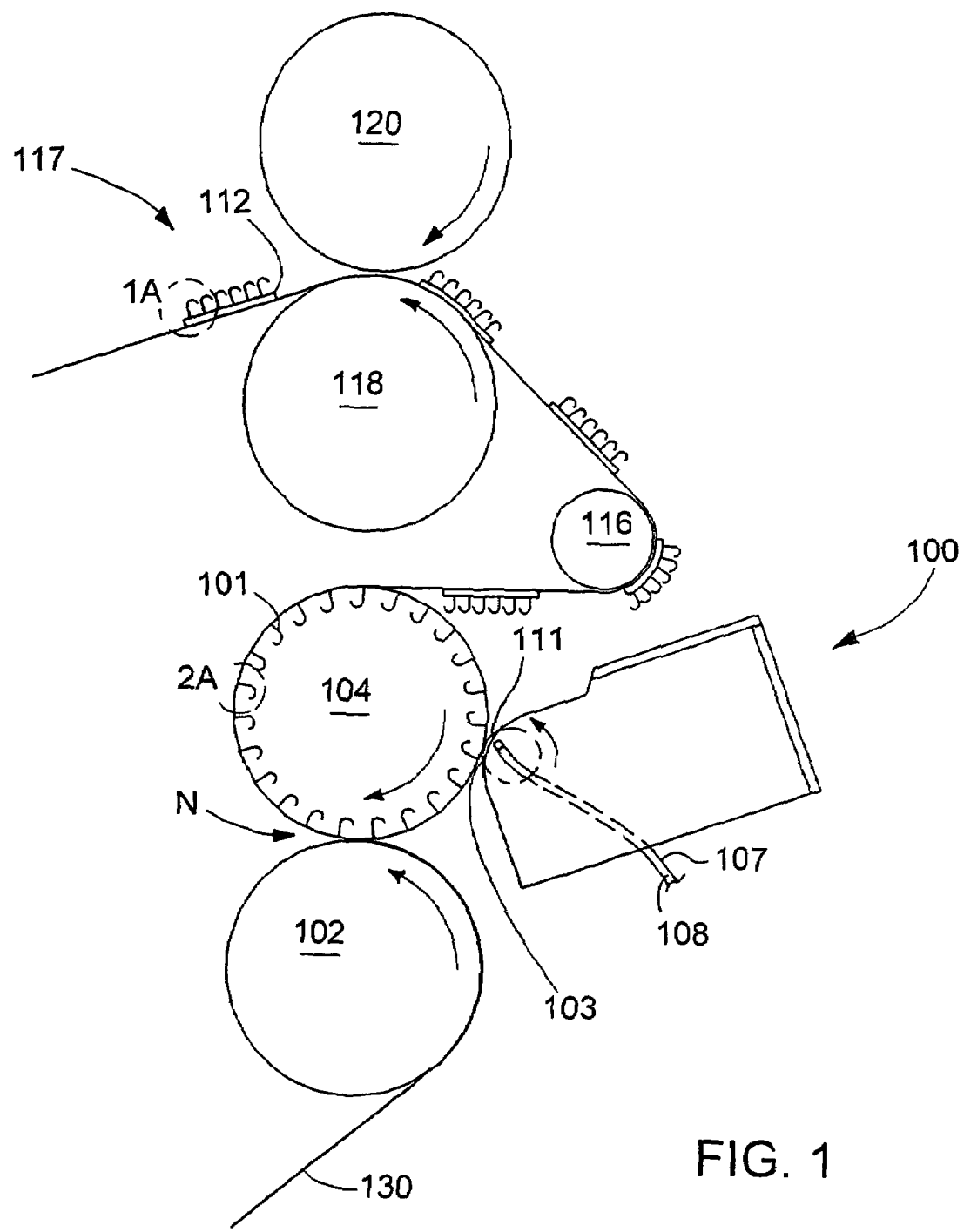
FIG. 1 is a cross-sectional view of a molding stack featuring a rotating die wheel die that includes an end fed rotating sleeve.

Referring to FIGS. 1-4, an apparatus for forming a sheet material having molded features on its surface includes a die 100 that includes a rotating cylindrical sleeve 103 that delivers discrete doses of resin 111 to a mold roll 104 through apertures 105 defined in an outer surface of the rotating sleeve 103. Die 100 is connected to an extruder (not shown) that delivers molten resin to an end 109 of the cylindrical sleeve 103 through flexible tubing 107. A pressure nip N is formed between a rotating pressure roll 102, and a cooled, rotating mold roll 104. Sheet material 130 is introduced to the pressure nip N, as is molten resin 108 by rotation of mold roll 104. The pressure in the nip N fills multiple inwardly extending cavities 101 of mold roll 104 to form fastener elements, while base 112 is formed on the surface of the mold roll 104. The pressure and heat in the nip N laminates base 112 to sheet material 130. Stripping the fastener elements from the mold roll 104 by stripping roll 116 frees fastener product 117. Further forming action, for example, "flat-topping" of the distal ends of the fastener elements or preforms, can occur between rolls 118 and 120. Flat-topping is described in U.S. Pat. No. 5,953,797, the entire disclosure of which is incorporated by reference herein. Rotation direction of each roll is indicated by arrows.

Figure 1A:
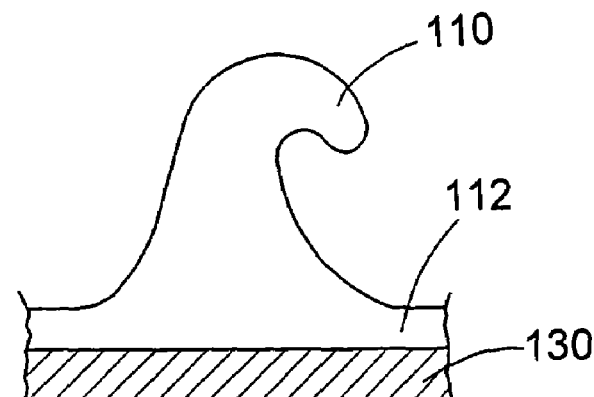
FIG. 1A is an enlarged view of area 1A shown in FIG. 1.
Figure 2A:
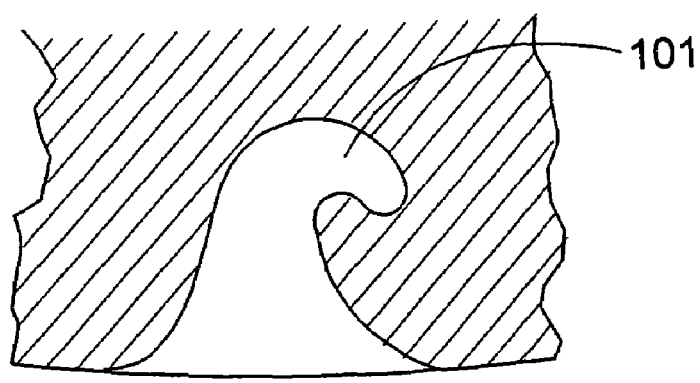
FIG. 2A is a cross-sectional view of one of the cavities of the mold roll shown in FIG. 1.
Figure 3:
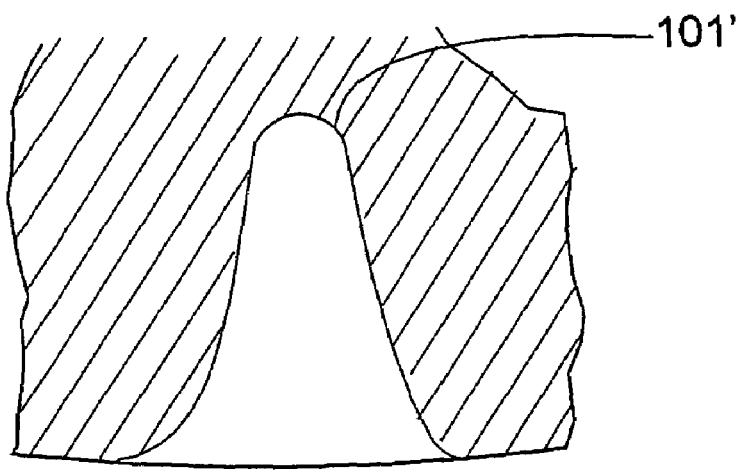
FIG. 3 is a cross-sectional view of a mold cavity shaped to form a preform fastener element.

Referring to FIGS. 1A and 2A, some fastener elements are formed in the shape of loop-engageable hooks 110 that extend outwardly from and are integral with base 112. Referring to FIG. 3, in some other embodiments, mold roll 104 includes cavities 101' in the form preform fastener elements intended to be subjected to further forming action. Other mold cavity shapes are also envisioned. For example, FIG. 5 shows a castellated preform 144 that can be readily molded, and then deformed by heat and/or pressure at the distal ends of its upper projections to form useful fastener elements, the heads of the resulting fastener elements shown in the fastener product top view of FIG. 5A. Further details regarding mold tooling are described in U.S. Pat. Nos. 4,775,310, 6,163,939 and 6,131,251, the entire disclosure of each is incorporated in full by reference herein.

Referring to FIGS. 5, 5A and 6, a machine 158 for forming fastener heads 161 of fastener product 163 from preformed elements 144 with projections 159 includes a heating device 160, that heats only a portion P of the projections 159, leaving the remainder of the projections relatively cool and thus relatively rigid. Portion P is heated to a softening temperature, at which time it can be formed into a desired head shape. To ensure that only portion P is heated to the softening temperature, contact or non-contact heating techniques can be employed. Heating device 160 includes a non-contact heat source 162 that is capable of quickly elevating the temperature of material that is very close to the heat source, without significantly raising the temperature of material that is relatively further away from the heat source. After portion P of the projections 159 has been heated, the base passes between conformation roll 166 and drive roll 168. Conformation roll 166 forms the portion P of the stems into a desired head shape, while drive roll 168 advances the base and flattens it against roll 166 to enhance head uniformity. Generally, to obtain the desired forming temperature it is advantageous to chill the conformation roll, e.g., by running cold water through a channel 170 in the center of the roll, to counteract heating of the conformation roll by the heat from portion P of the stems.

Additional details regarding this process are described in U.S. patent application Ser. No. 10/455,240 and U.S. Pat. No. 6,248,276, the entire disclosure of each of which is hereby incorporated by reference herein.

Figure 7A:
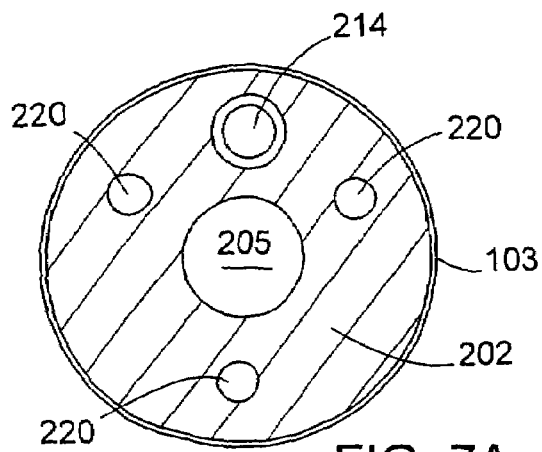
FIG. 7A is a cross-sectional view of the die wheel shown in FIG. 7, taken along line 7A-7A.
Figure 7B:
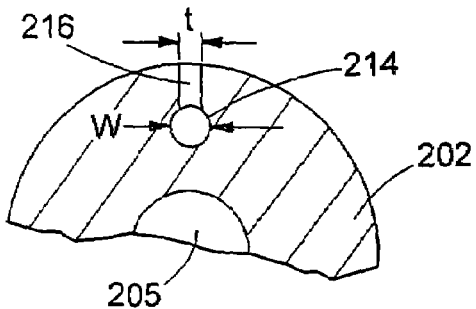
FIG. 7B is a cross-sectional view of the die wheel shown in FIG. 7, taken along line 7B-7B.
Figure 7E:
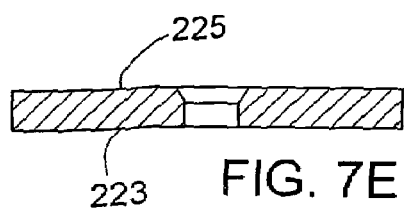
FIG. 7E is a cross-sectional view of an alternative rotating sleeve showing flow channel.
Figure 7D:
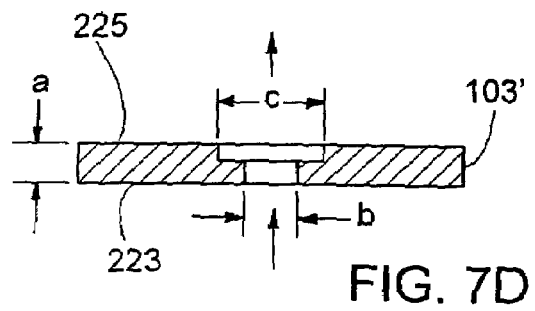
FIG. 7D is a cross-sectional view of a rotating sleeve showing flow channel geometry.
Figure 8:
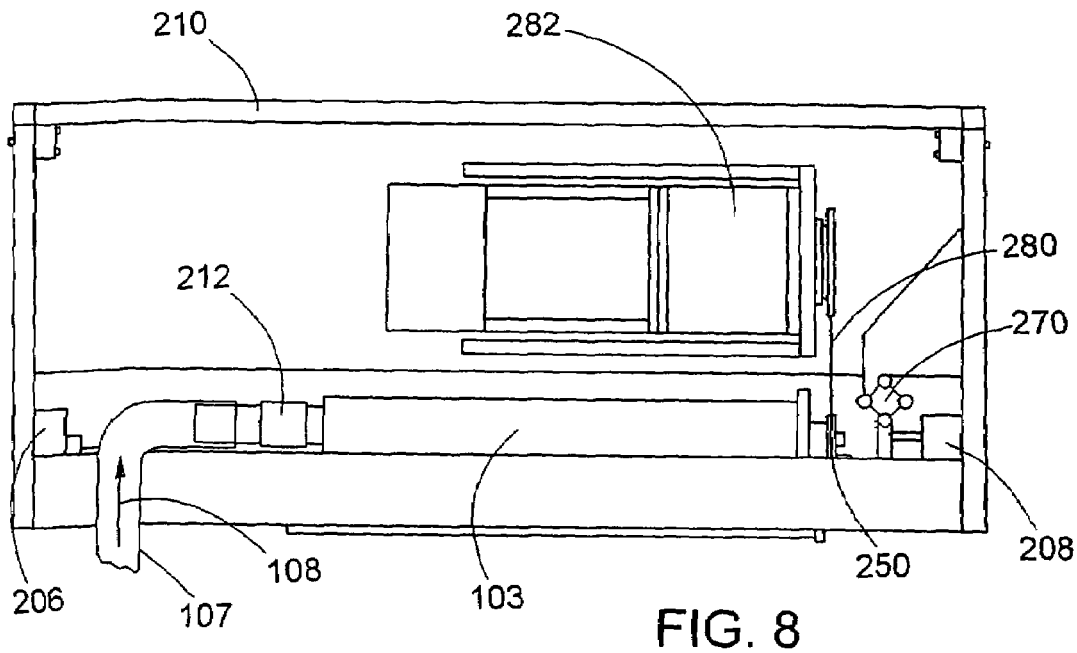
FIG. 8 is a back view of the rotating die wheel die shown in FIG. 1, looking into die housing.

Referring to FIGS. 7-8, rotating die wheel die 100 includes a rotating die wheel 200 that includes a rotating sleeve 103 that rotates over a stationary manifold 202. Manifold 202 sits upon shaft 204 that is inserted through manifold 204 via a channel 205 defined therethrough. Shaft 204 is mounted into a pair of mounts 206,208 and the mounts connect the die wheel 200 to die housing 210 (FIG. 8). Molten resin 108 enters the manifold through a hose 107 connected to a high pressure fitting 212 and flows through a channel 214 that terminates into a slit 216. Molten resin flows under pressure from the slit 216 through an aligned aperture 105 in sleeve 103. To maintain the resin in a molten state, manifold 202 is heated with three thermocouples 220. Referring now particularly to FIG. 7C, the spacing T between an inner surface 223 of sleeve 103 and an outer surface 221 of manifold 202 is maintained at less than about 0.005 inch (0.127 mm) to prevent leakage of plastic from the slit region. The spacing T employed depends in part upon the melt flow rate (MFR) of the resin used, as determined by ASTM test method D1238, the entire contents of which is hereby incorporated by reference herein. Generally, lower melt flow resins, e.g., 0.5 to about 5 g/10 minutes have a lower tendency to flash spacing T, while higher melt flow plastics, e.g., 20 to about 30 g/10 minutes have a higher tendency to flash spacing T. Referring back to FIG. 7 for more detail on the rotational portion 226 of die wheel 200. Rotational portion 226 is assembled upon shaft 204 by fixing manifold locators 230,232 in recess 234 using bolt 240. Drive 242 is fixed to sleeve 103 using screw 246. Drive 242 is connected to sprocket 250 that rides upon bearing 260 held in place with screws 261,263 by bearing retainer 262. Worm gear drive connector 270 allows for minor adjustments in the location of sleeve 103 relative to slit 216. Referring now to FIGS. 1, 7 and 8, sleeve 103 is rotated about stationary manifold by a motor 282 connected to sprocket 250 by chain 280, such rotation of sleeve 103 by slit 216 delivering molten resin to a surface, for example, a mold roll, in discrete doses through apertures 105 defined in an outer surface of the rotating sleeve 103.

Figure 4:
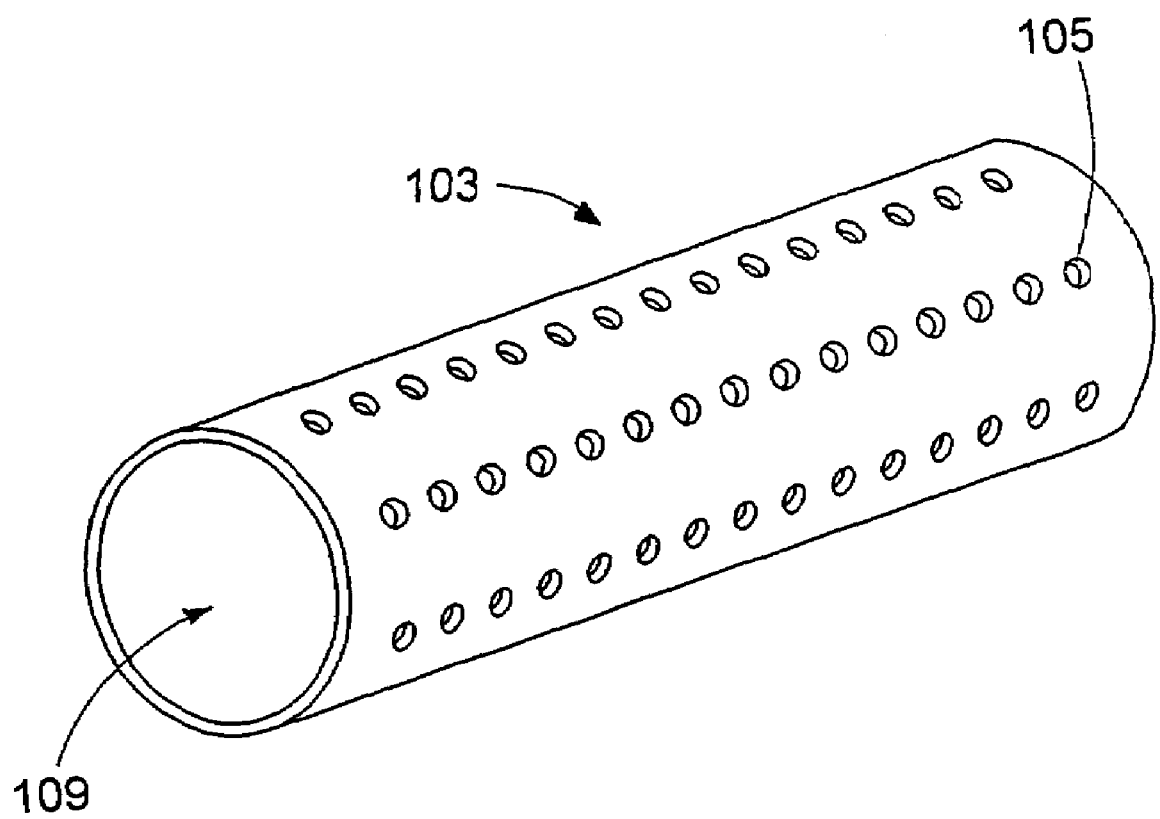
FIG. 4 is a perspective view of a rotating, multiple-orifice die wheel sleeve.

Referring particularly to FIG. 7B, in some embodiments, slit thickness, t, and channel width, w, is 0.25 inch (0.635 cm) and 0.50 inch (1.27 cm), respectively. Although apertures 105 shown in FIGS. 4 and 7 are constant in cross-sectional area through the thickness of the sleeve, in some embodiments they are not. Referring particularly to FIGS. 7D and 7E, the cross-sectional area from an inner surface 223 to an outer surface 225 of the sleeves can change gradually, as shown in FIG. 7E, or it can change rapidly as a step, as shown in FIG. 7D. This change in cross-sectional area causes a pressure drop, and this can be advantageous when it is desired to deliver molten resin to a surface at low pressures. In a particular implementation, rotating sleeve 103' has a thickness, a, of 0.093 inch (0.236 cm), an entrance width, b, of 0.032 inch (0.0813 cm), and an exit width, c, of 0.093 inch (0.236 cm).

In some instances, the cylindrical sleeve 103, is metal. In some instances, when it is desired to inhibit adhesion of molten resin to the cylindrical sleeve, the rotating cylindrical sleeve is made entirely of an adhesion-resistant material or is coated with an adhesion-resistant material, for instance, a fluoropolymer. Cylindrical rotating sleeve 103 can be fabricated by machining apertures in circular cross-section stock. Among various embodiments, the number of apertures range from about 2 to about 20 or more, e.g., 5, 10, 15 or more, e.g., 100 depending upon the size of the desired size of the deposits and spacing between them. In some embodiments, the apertures are closely spaced such that adjacent doses of resin at least partially merge.

In certain implementations, the turn rate of sleeve 103 is associated with a speed control device which functions independently of the speed of rotation of the mold roll 104 so that the surface speed of the sleeve may be equal to, faster than, or slower than the surface speed of the mold roll. This allows for design flexibility in the final product. For example, a differential speed can be maintained to cause the material to smear the deposit of resin onto a surface to obtain a particular shaped deposit. It is presently preferred for the surface speed of cylindrical sleeve 103 to be about two percent less than the surface speed of the mold roll to affect adequate transfer.

Referring to FIG. 11, during the time of rotation from position I to position II, a resin mass is gradually delivered by pressure flow to the surface of roll 104, available to be transferred at position III to the surface of mold roll. The flow of resin through the various apertures is aided by the phenomenon of "die swell", i.e., the expansion of molten resin as it transitions from the high delivery pressure to atmospheric pressure. The effects cause molten resin to bulge outwardly, e.g., beyond the periphery of the sleeve as illustrated in FIG. 11. In the region of the line of centers of sleeve 103 and mold roll, the bulged resin is engaged by the roughness of mold roll surface. The cavities provide a functional degree of effective roughness or "graspiness" to the surface of mold roll 104 and, aid in the separation of the resin from cylindrical sleeve 103. It is not necessary that the transferred resin fill any portion of the cavities at this point, only that it cling to the surface of the mold roll.

Referring to FIG. 11A, with respect to applying the resin in advance of application of molding pressure, it is realized that the low thermal conductivity of the molten resin, the limited duration of contact of the resin with the mold roll surface between point of resin delivery and point of application of nip pressure, and the insulating quality of the air-filled mold cavities themselves combine to enable the successful later filling of the mold cavities with the applied resin. Thus we find it unnecessary, given the techniques described herein, to deliver molten resin directly to the mold nip, or to the cavities under pressure, as has been practiced in the past. The transferred resin 180 in regions 182 is subjected to a higher rate of cooling than the resin in regions 181 because regions 182 are in direct contact with the surface of the mold roll between adjacent cavities, whereas regions 181 have reduced thermal transfer characteristics because cavities 101 are filled with insulating air. This causes surface resin in regions 182 to be more solidified when entering the nip and therefore more resistant to shear flow and longitudinal polymer orientation. This can result in a fastener product with a lower tendency for tear propagation in the machine or production direction. Even so, it is presently preferred to position the point of application of the resin such that the resin is exposed to cooling for a time less than about 0.5 seconds before entering the nip, preferably less than about 0.1 second. At preferred line speeds, the point of application of the resin is spaced from the nip a distance of less than about 10 inches (25.4 cm), preferably less than 5 inches (12.70 cm). The presently preferred surface speed of the mold roll is at least 150 feet per minute (45.7 m/min), preferably more than 250 feet per minute (76.2 m/min).

Referring back to FIG. 1, the transferred resin is introduced to a sheet material 130 in the nip. The sheet material can be a woven, non-woven, or a knit material. The sheet material can also be a foam, a film, a paper web, a polycoated paper web, a composite web, such as webs that include one or more elastomeric films. The parameters of the process can be selected to advantageously deliver partially solidified resin to the nip. This can be particularly useful with relatively open materials (e.g., fabrics) to lessen the tendency for excessive penetration of the resin into the material and to prevent strike-through of resin through the complete thickness of the material. Thus, a textile sheet material to which molded formations are laminated can more closely retain its original properties, while using less resin.

In particular examples, the above technique is advantageously employed to apply molded features upon thin, spun bonded fabrics that heretofore have not been considered suitable to process for many end products. This is important since, in many fields, such as personal care products, medical sheets used for wrappings, clothing, and drapes, thinner, less expensive and more pliant webs are desired. The integrity of the molded base layer can enable the application of substantial demold forces even where very thin materials serve as a backing. Retention of the integrity of the resin base layer under neighboring hooks helps ensure that the layer has sufficient strength to enable demolding of complex shapes. In this manner hooks having highly aggressive profiles and preform stems of complex shape that resist demolding can be formed onto thin and relatively weak substrate materials.

Allowing the resin to cool slightly as it travels on the mold roll surface before entering the nip reduces the overall exposure of the sheet material to hot molten resin. Heretofore, many sheet materials for in-situ lamination were restricted to relatively expensive polyesters or other temperature-resistant resins. The methods described herein can enable the use of lower cost materials or strands as supporting material, such as those formed of fibers of polypropylene, polyethylene or blends, in place of temperature resistant resins such as polyester.

Figure 9:
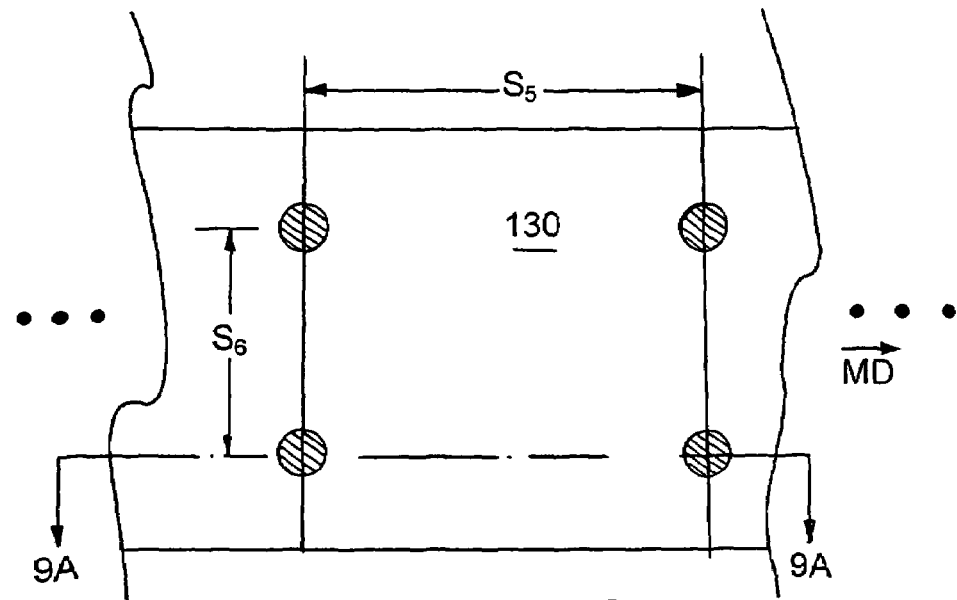
FIG. 9 is a top view of an exemplary fastener product.
Figure 9A:
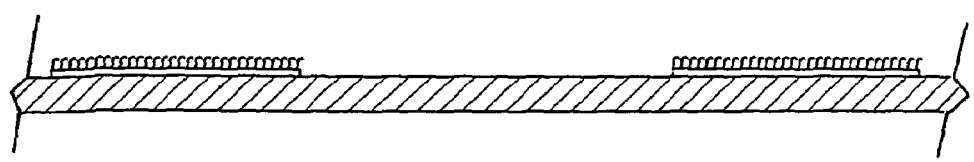
FIG. 9A is a cross-sectional view of the fastener product shown in FIG. 9, taken along line 9A-9A.

Referring to FIGS. 1 and 12, in one mode of rotational operation, the sleeve has circumferential arrays of apertures of desired form at desired circumferential spacings and the sleeve is turned continuously about the stationary slit 216 to bring individual apertures of each array in sequence into registry with slit 216, by which each aperture of sleeve 400 in turn receives a flow of resin and forms a deposit on the mold roll of shape determined by the contour of the aperture, e.g., circular in cross-section or triangular in cross-section. In some implementations, the apertures are shaped like an ellipse in cross-section so that the deposits of resin form circular deposits after passing through the nip. Here the sleeve is effectively a printing roll that forms deposits of molten resin of desired peripheral size and shape. Referring to FIGS. 9, 9A and 12, if the sleeve shown had only the two apertures of row $A_5$, the resulting product would look like that shown in FIGS. 9 and 9A. The spacing $S_5$ in this particular example is $2\pi r$, where r is the radius of the sleeve and the spacing $S_6$ in the product is the distance along the rotational axis between the center of the apertures in sleeve 400 as shown in FIG. 12.

Figure 10:
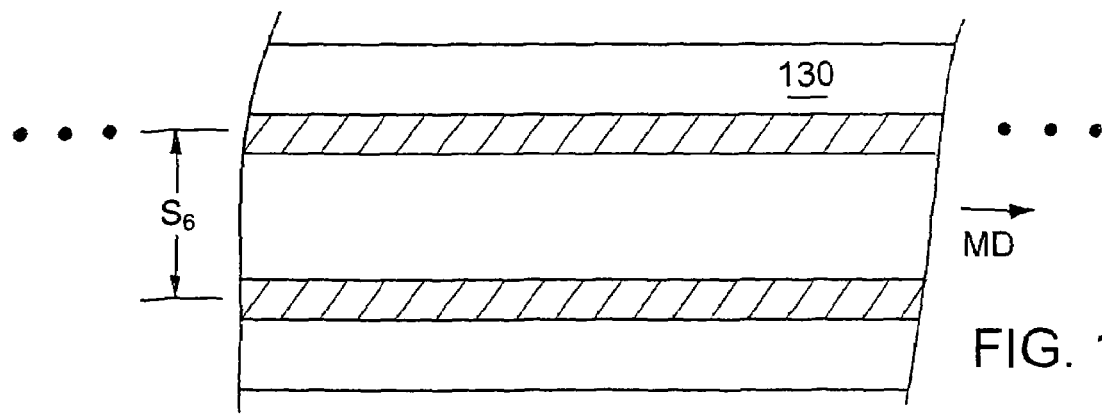
FIG. 10 is a top view of another exemplary fastener product made from the die shown in FIG. 1.
Figure 10A:
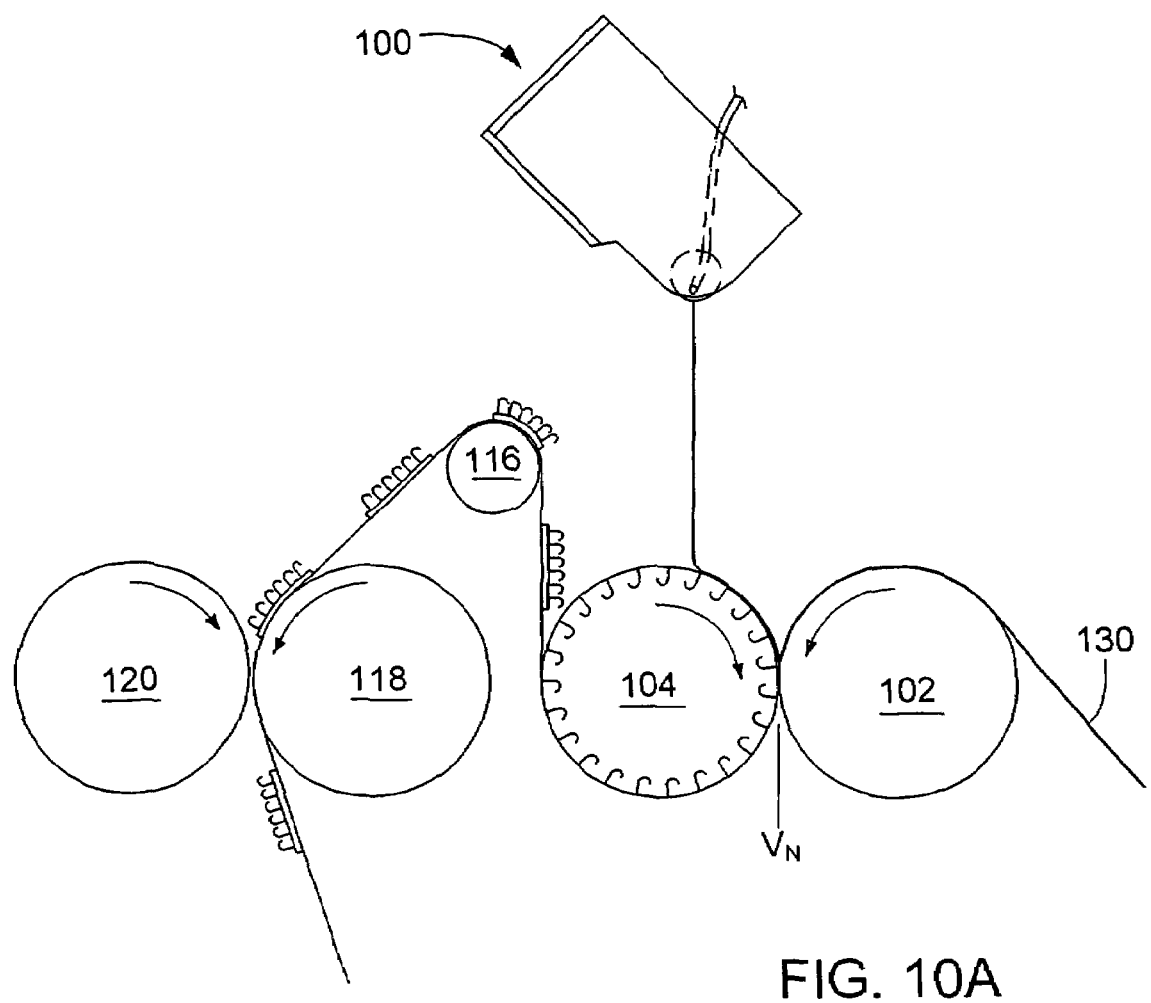
FIG. 10A is a cross-sectional view of resin being delivered to a mold roll under the influence of gravity.

In another mode of operation, sleeve 400 is held stationary (i.e., motor 282 is de-energized) at a suitable position to deliver a continuous flow of resin to the mold roll surface through selected apertures in the sleeve 400. By adjustment of the position of sleeve 103, a desired row of apertures $A_1, A_2, A_3, A_4$ and $A_5$ can be brought into registry with slit 216. Then, with sleeve 400 held stationary, continual streams of resin of desired width and location can be produced and transferred to the mold roll. Referring to FIGS. 10 and 12, if sleeve 400 is held stationary with the slit in registry with $R_5$, the resulting product would look like that shown in FIG. 10. The spacing $S_6$ in the product is the distance along the rotational axis between the center of the apertures in sleeve 400 as shown in FIG. 12. Referring to FIG. 10A, in some implementations, continual streams of resin of desired width and location can fall under the influence of gravity upon the mold roll. While the molding stack of FIG. 10A is shown with all rolls in a line, in some embodiments, they are staggered to accommodate the resin supply devices, e.g., devices that apply discrete doses of resin upon the surface of the mold roll, and material entry paths of the various systems mentioned herein.

Figure 13:
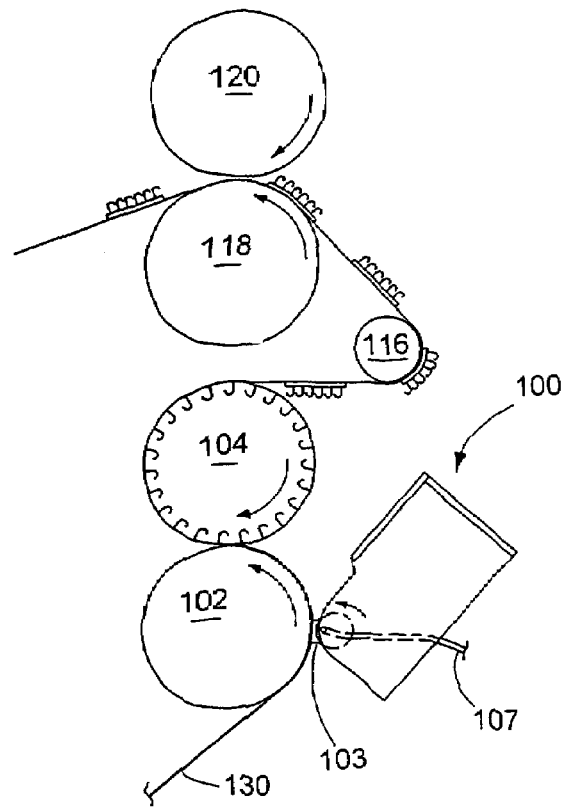
FIG. 13 is a cross-sectional view of a molding stack featuring a rotating die wheel die that includes an end fed rotating sleeve delivering molten resin to a sheet material trained about a pressure roll.

Referring now to FIG. 13, rather than resin being transferred from sleeve 103 to mold roll 104, it can be delivered directly to sheet material 130 that is trained about pressure roll 102. In some implementations, the insulating properties of the sheet material 130 can be advantageously used to deliver resin that is solidified at the sheet material/resin interface, but is molten above that so that the pressure of the nip can fill the cavities of the mold roll. This type of prenip delivery can be used to produce fastener products that show a lesser tendency for rip propagation in the machine direction due to less machine direction orientation that results from partially solidified resin at the material/resin interface.

Figure 14:
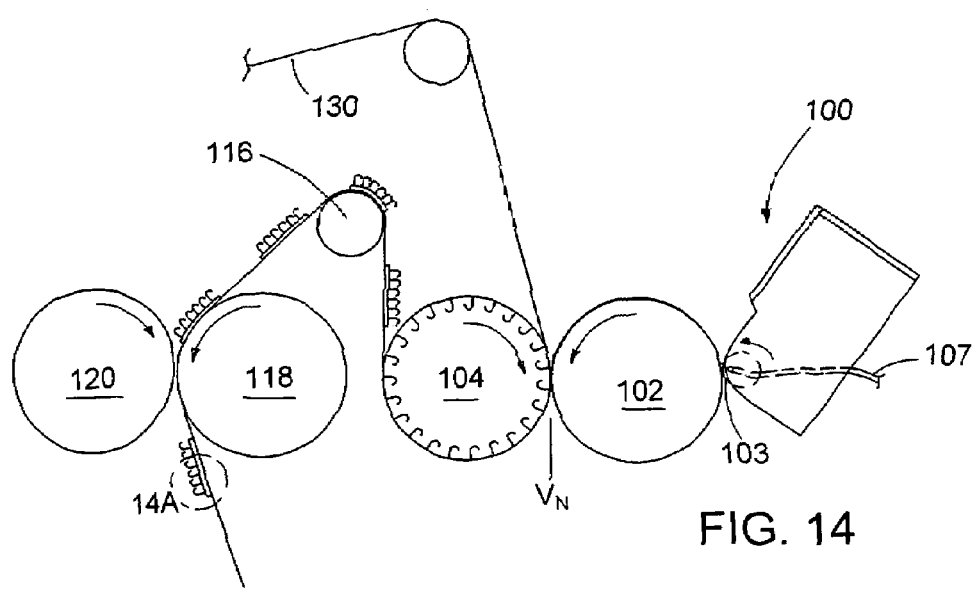
FIG. 14 is a cross-sectional view of a molding stack featuring a rotating die wheel die that includes an end fed rotating sleeve delivering molten resin to a sheet material trained about the mold roll.
Figure 14A:
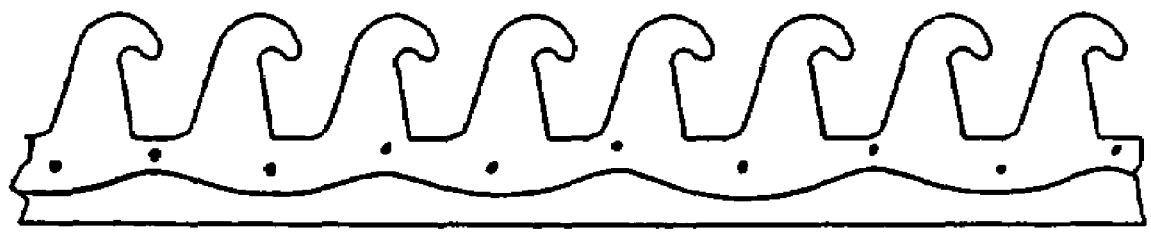
FIG. 14A is an enlarged view of area 14A shown in FIG. 14.

Referring to FIG. 14, a molding stack with a vertical nip plane $V_N$ is shown and illustrates that rather than resin being transferred by sleeve 103 to the mold roll 104, it can be delivered directly to the pressure roll 102, and then delivered to the nip N by rotation of pressure roll 102. In this embodiment, the sheet material is a relatively porous type of material (e.g., a scrim material) such that when the molten resin and the sheet material come together in the nip N, the pressure therein forces the resin completely through the sheet material to mold fastener elements on the other side. A cross-sectional view of the resulting fastener product is shown in FIG. 14A. Such porous sheet materials are described in U.S. patent application Ser. No. 10/688,301, the entire disclosure of which is hereby incorporated by reference herein.

Figure 15:
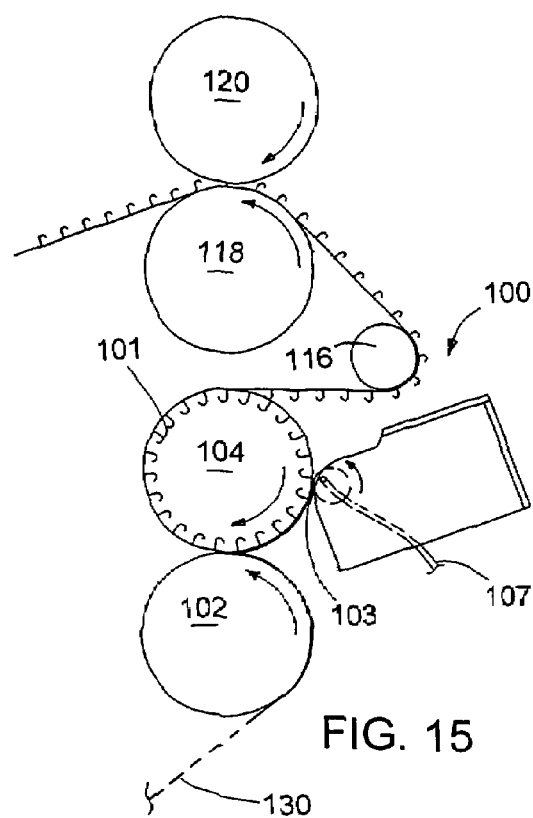
FIG. 15 is a cross-sectional view of a molding stack featuring a rotating die wheel die that includes an end fed rotating sleeve delivering molten resin to a mold roll, the resin being extruded at a rate that causes adjacent doses of resin to merge together.

Referring to FIG. 15, resin can be transferred from sleeve 103 to mold roll 104 at such a rate that adjacent doses of resin at least partially merge on mold roll 104. After passing through pressure nip N, one contiguous sheet of fastener elements is formed. This method can be used to produce fastener products with particularly thin bases 112. In addition, this method can be used advantageously to produce fastener products with a lower tendency for tear propagation in the machine direction since the molten resin being in contact with mold roll 104 is cooled more relative to that not in contact with the mold roll as discussed above. As shown in FIG. 15, the base may be optionally laminated to a carrier sheet.

Figure 16:
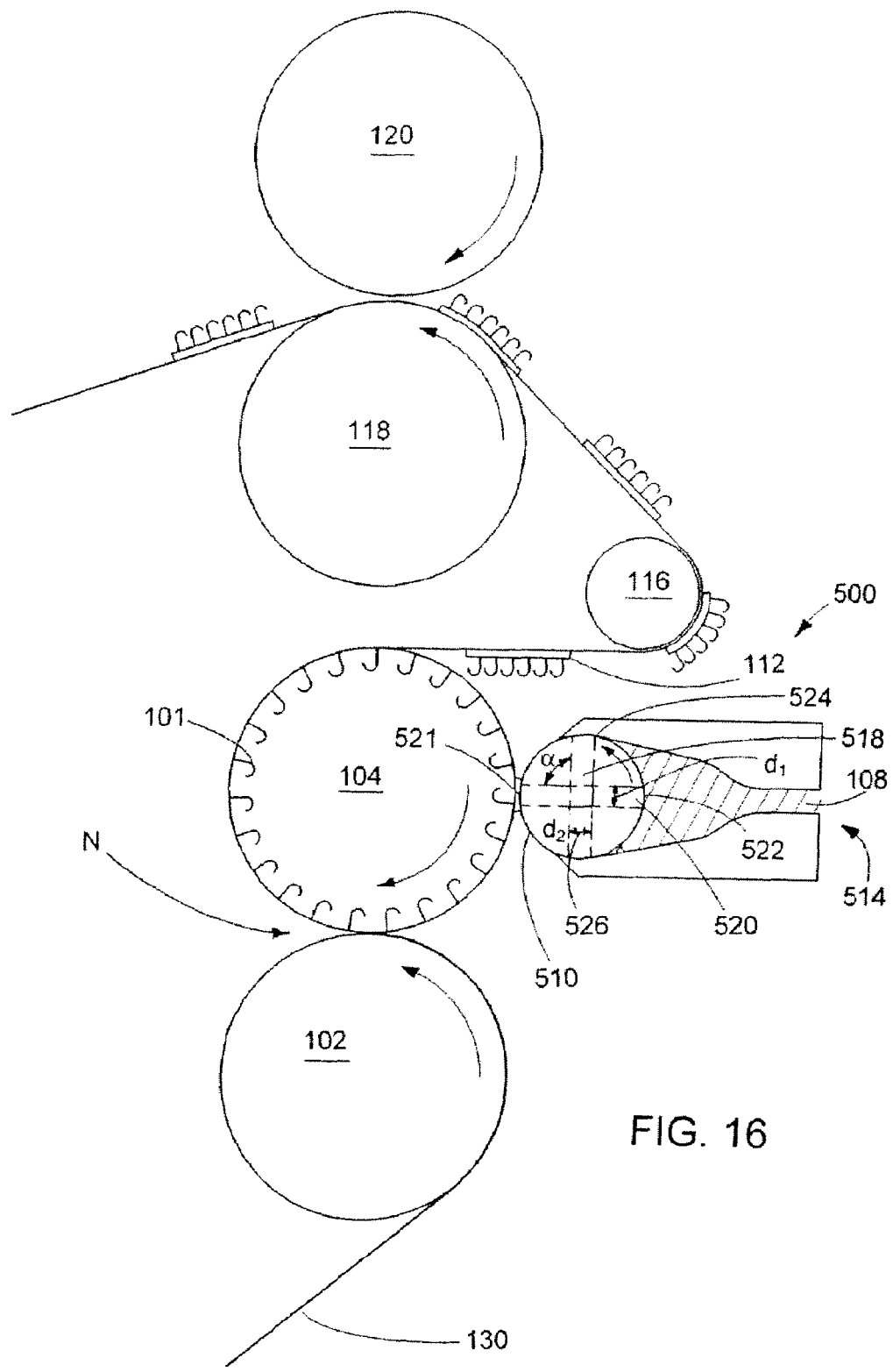
FIG. 16 is a cross-sectional view of a calender stack featuring a throat fed rotating die wheel die delivering molten resin to a mold roll.
Figure 17:
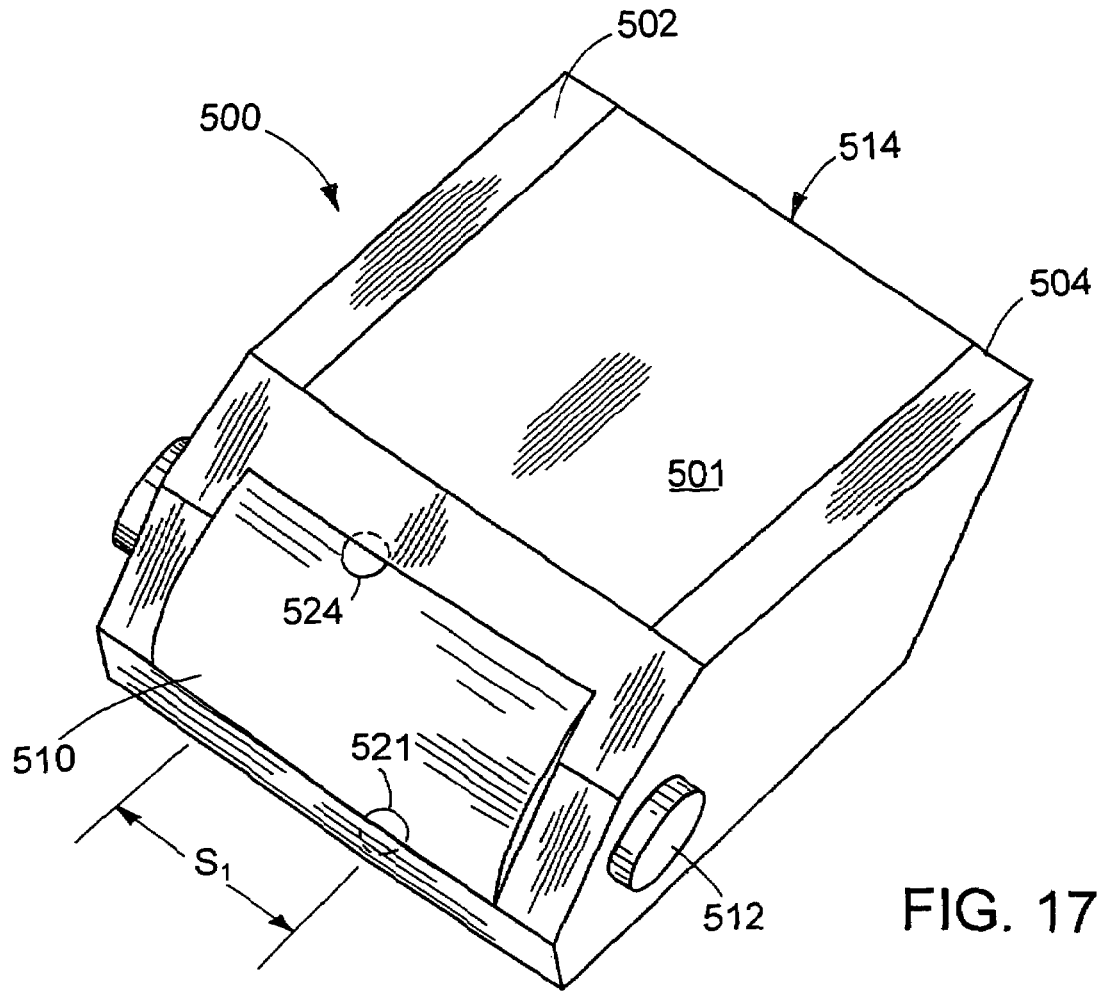
FIG. 17 is a perspective view of a throat fed rotating die wheel die shown in FIG. 16.
Figure 17A:
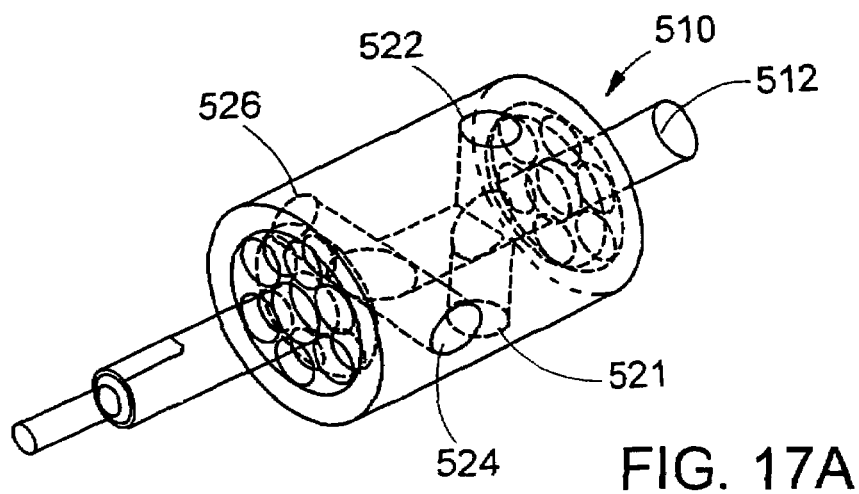
FIG. 17A is a perspective view of the rotating die wheel shown in FIG. 17 disassembled from the housing.

Referring to FIGS. 16-17A, die 500 includes two side plates 502,504 that mount and hold rotatable delivery cylinder 510. Rotatable cylinder 510 is rotated by an axle 512 connected to a drive, for example, a chain driven by a gear motor. The throat fed (back fed) die includes an inlet port 514 for receiving the molten resin 108. Cylinder 510 has two delivery channels 518,520. These channels extend through the body of the delivery cylinder, terminating at respectively opposite pairs of apertures 521,522 and 524,526 in the cylinder surface. Channels 518,520 form angle α with each other, angle α shown here as 90°. Depending upon the pattern desired, the channels may be parallel to one another or set at other selected angles. The diameters of $d_1, d_2$ of channels 518,520, are selected according to the size of the resin deposits to be delivered, and may range for instance between 1/16 inch and 0.50 inch (0.159-1.27 cm). As cylinder 510 turns, the apertures of the channels alternately serve inlet and delivery functions. With rotation of cylinder 510, the cross-sectional area of each aperture, in turn, is exposed to the resin supply first partially, then fully, and then it is progressively closed by the surrounding portions of the stationary die housing 501. As aperture 521 of channel 522 becomes closed, aperture 524 of channel 518 opens, in a manner that maintains the aggregate flow area so that a constant net flow can be maintained.

Figure 18:
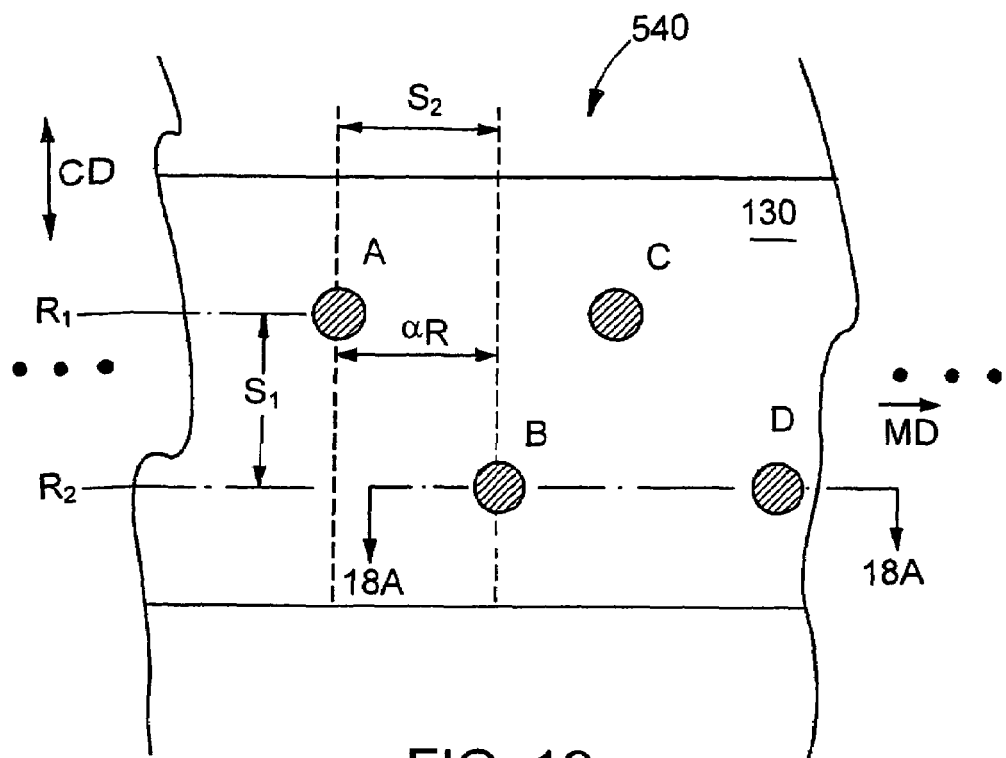
FIG. 18 is a top view of an exemplary fastener product made from the die shown in FIG. 17.
Figure 18A:
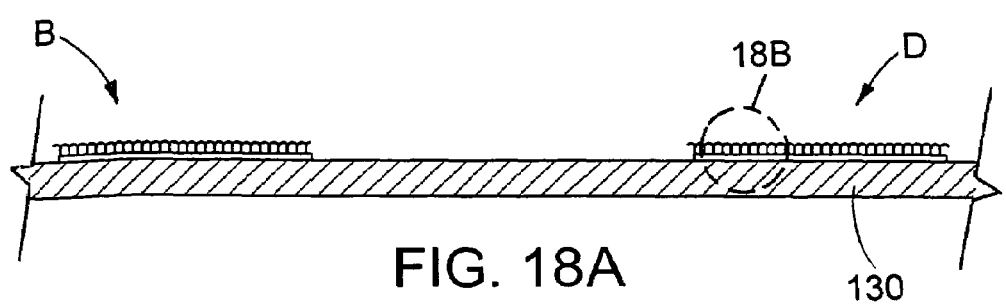
FIG. 18A is a side view of the fastener product shown in FIG. 18, taken along line 18A-18A.
Figure 18B:
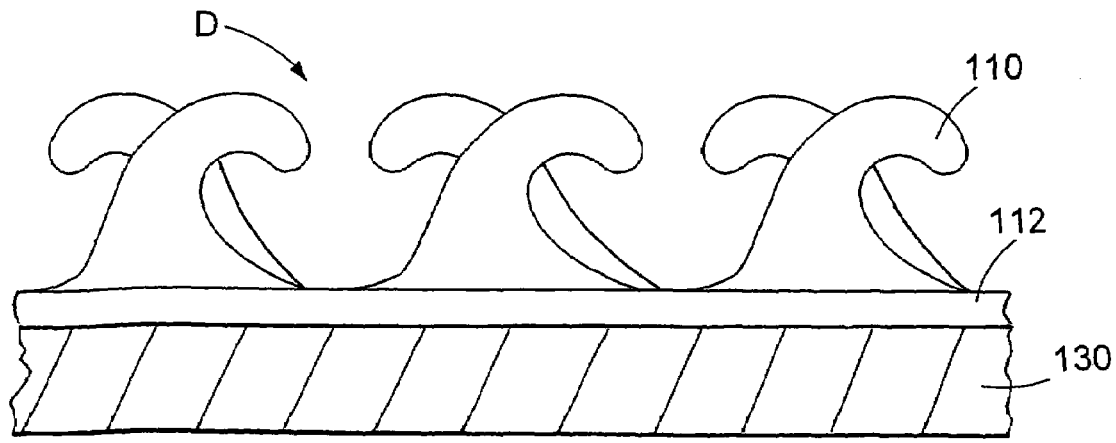
FIG. 18B is an enlarged view of area 18B shown in FIG. 18A.

Referring to FIGS. 17 and 18, fastener product 540 is made using die 500 with cylinder 510. Referring particularly to FIG. 18, on preformed web 130 there are discrete regions A, B, C and D, each having a large multiplicity of fastener elements, in this particular case, in the form of loop-engageable hook-shaped projections, as seen from FIGS. 18A and 18B. Discrete regions A-D are arranged in rows $R_1$, $R_2$ in a first direction, for example, the machine direction (MD), with a spacing $S_1$ between the rows in the orthogonal direction, e.g., the cross-machine direction (CD). Discrete regions in adjacent rows $R_1,R_2$ are offset by spacing $S_2$. $S_2$ is the circumferential distance equal to $\alpha R$, where R is the radius of cylinder 510 and $S_1$ is the distance between apertures as shown in FIG. 17.

Figure 19:
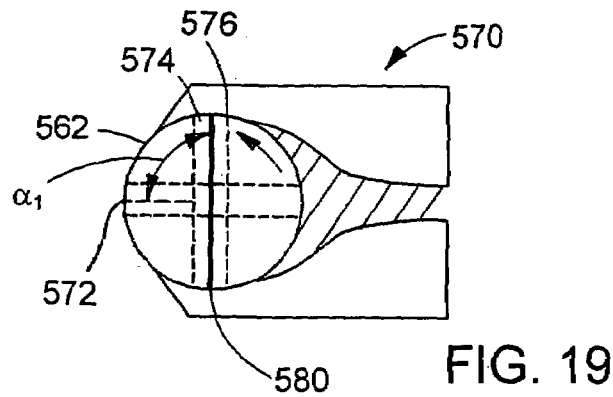
FIG. 19 is a side view of an alternative throat fed rotating die wheel.
Figure 20:
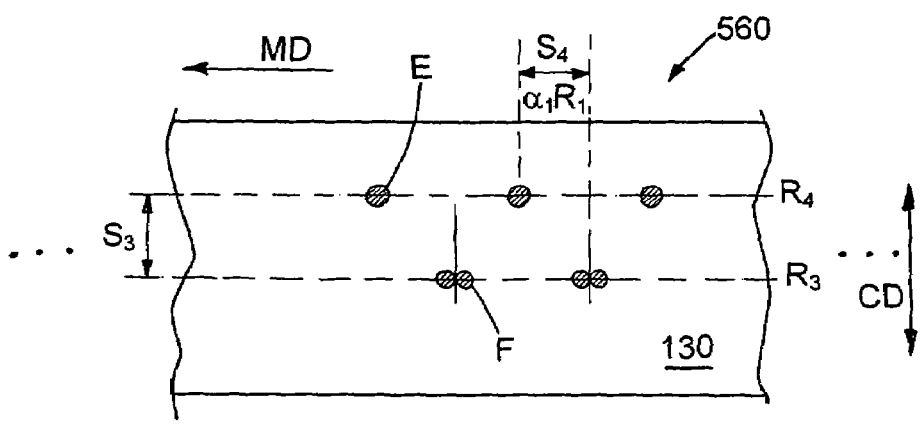
FIG. 20 is a top view of an exemplary fastener product made from the die shown in FIG. 19.

Although the diameters of the apertures shown in FIG. 17 are the same, in other embodiments they are not. Referring to FIG. 20, fastener product 560 is shown that results from using the rotating cylinder 562 shown in FIG. 19. Die 570 delivers two deposits in row $R_3$ for each one deposit in row $R_4$. In this example, the cross-sectional area of aperture 572 and its flow channel is substantially equal to twice the cross-sectional area of that of aperture 574 or 576. In this example, regions E and F are arranged in respective rows $R_3,R_4$ with spacing $S_3$ between rows. The discrete regions are offset in the machine direction by a spacing $S_4$, where $S_4$ is equal to $\alpha_1 R_1$, $R_1$ being the radius of the cylinder and $\alpha_1$ being the angle in side view from the center of aperture 572 to the center of the wall 580 that separates apertures 574 and 576. $S_3$ is the lateral distance between adjacent holes along rotational axis of the cylinder 562, similar to that described above in reference to FIG. 17.

Figure 21:
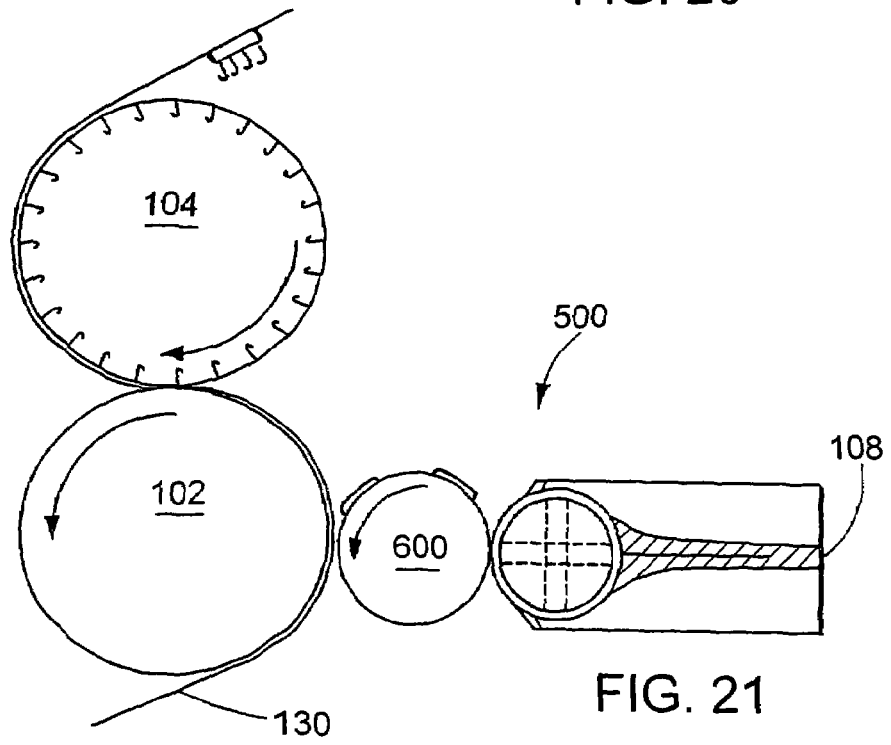
FIG. 21 is a cross-sectional view of the die shown in FIG. 17 delivering molten resin to a cylindrical transfer roll.

Referring to FIG. 21, a cylindrical transfer roll 600 is combined with die 500 to apply molten resin 108 directly to a sheet material 130 trained about pressure roll 102. This arrangement facilitates different machine configurations and can introduce a further mode of control. Using transfer rolls to deliver molten resin is described in a povisional patent application filed concurrently herewith, entitled "Transferring Resin for Forming Fastener Products," and assigned Ser. No. 60/554,234 the entire contents of which is incorporated by reference herein.

Figure 22:
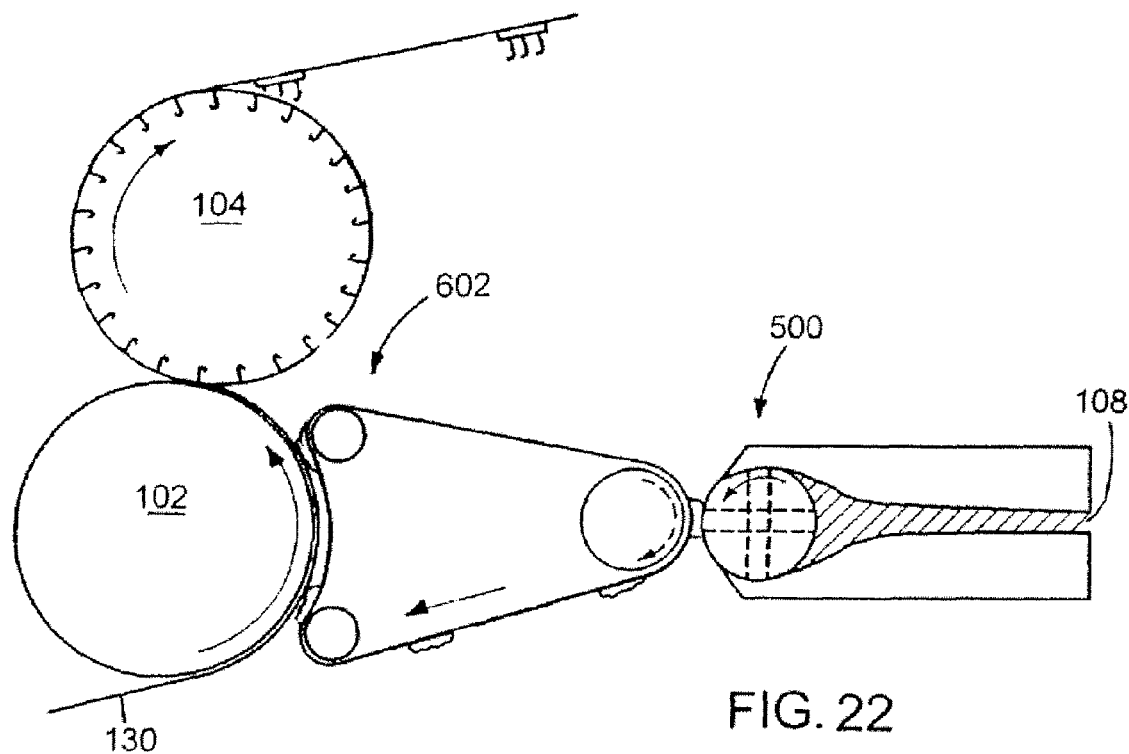
FIG. 22 is a cross-sectional view of the die shown in FIG. 17 delivering molten resin to a transfer belt.

Referring to FIG. 22, a transfer belt 602 is combined with die 500 to deliver molten resin directly to a sheet material 130 trained about pressure roll 102. The belt is formed of an insulating material, for example, a heat resistant synthetic material such as silicone rubber. Delivering molten resin by transfer belt 602 can be advantageous when the insulating properties of belt 602 are desired and/or when longer contact time with the sheet material is desired to obtain better transfer of the resin.

Figure 23:
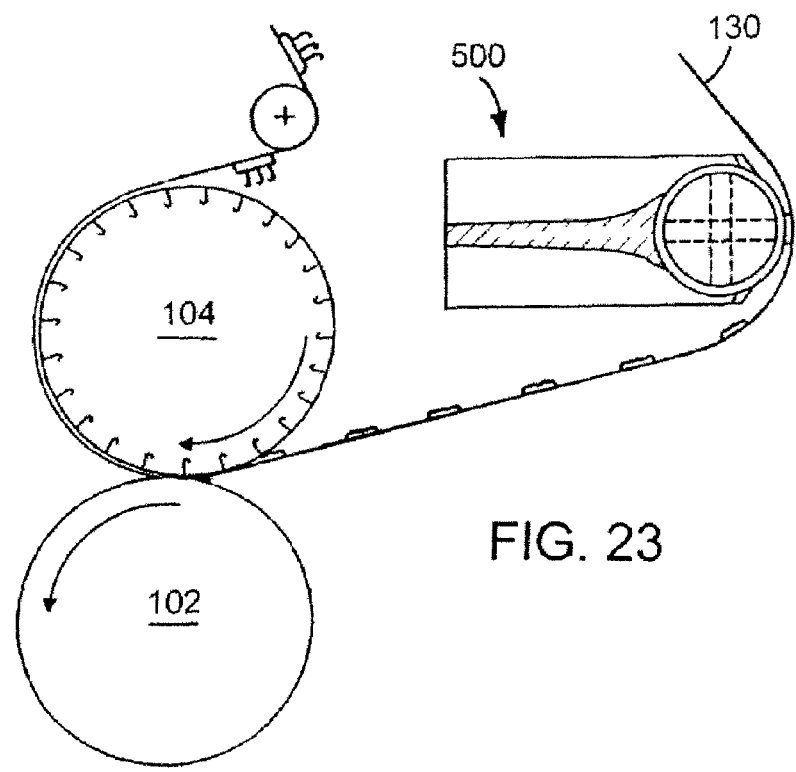
FIG. 23 is a cross-sectional view of the die shown in FIG. 17 with a sheet material trained about it.

Referring to FIG. 23, die 500 is delivering molten resin to sheet material 130 trained about it. By varying the upstream delivery location, the amount of cooling the resin undergoes atop the sheet material may be adjusted.

A number of embodiments of the invention have been described. Nevertheless, it will be understood that various modifications may be made without departing from the spirit and scope of the invention. For example, while the nip plane of the calender stack shown in FIG. 1 is horizontal, it can be vertical such that the molten resin falls out of the die under the influence of gravity. The point of delivery of the molten resin in any of the embodiments described above can be different than shown in the figures. For example, the molten resin being delivered to the tool roll shown in FIG. 1 can be delivered closer or further away from the nip N. The embodiments shown in FIGS. 21-23 can be used with either of the rotating die wheels described above. While FIG. 1 shows fastener elements in the shape of hooks, and FIG. 5A shows fastener elements derived from preformed stems, other fastener elements are possible. For example, the fastener shapes described in U.S. Pat. No. 5,884,374, the entire disclosure of which is hereby incorporated by reference herein. Accordingly, other embodiments are within the scope of the following claims.

What is claimed is:

1. A method of making fastener products having an array of male fastener elements formed of resin, the method comprising:
    providing a mold roll defining an array of cavities extending inwardly from an outer surface thereof, the mold roll positioned adjacent a counter-rotating pressure roll to define a pressure nip;
    extruding moldable resin in discrete doses through an orifice defined in an outer surface of a rotating die wheel;
    transferring the extruded resin into the pressure nip in such a manner that the resin is transferred into the nip in discrete regions corresponding to the doses of extruded resin;
    laminating the moldable resin to a carrier sheet;
    pressing the regions of resin into multiple cavities of the mold roll in the pressure nip to form at least the stems of the fastener elements, while forming a base of the resin on the surface of the mold roll, the base interconnecting the fastener element stems; and
    stripping the resin from the mold roll surface on the carrier sheet;
    wherein the resin is carried into the pressure nip on the carrier sheet; and
    wherein the carrier sheet passes through a nip defined between the die wheel and a counter-rotating roller.

2. The method of claim 1, wherein the resin is transferred as a series of discrete regions spaced apart according to revolutions of the die wheel.

3. The method of claim 1, wherein the resin is transferred as a multiple number of regions per revolution of the die wheel.

4. The method of claim 1, wherein the die wheel defines multiple extrusion orifices.

5. The method of claim 1, wherein the extrusion orifices are spaced apart along a rotational axis of the die wheel.

6. The method of claim 1, wherein the extrusion orifices are spaced apart about a circumference of the die wheel, such that multiple discrete regions of resin are transferred per revolution of the die wheel.

7. The method of claim 1, wherein the resin is extruded at such a rate that causes adjacent doses of resin to merge on the carrier sheet.

8. The method of claim 7, wherein the adjacent doses merge under nip pressure to form the base as a contiguous layer of resin.

9. The method of claim 1, wherein the multiple extrusion orifices are arranged adjacent one another in a grouping, such that doses of resin from the orifices in the grouping are transferred into the pressure nip in a pattern of an overall shape determined by a shape of the grouping of orifices in the die wheel.

10. The method of claim 9, wherein the adjacent doses of resin in the transferred pattern merge to fill the overall pattern shape with a contiguous layer of resin.

11. The method of claim 1, wherein the orifice is elongated at the outer surface of the die wheel.

12. The method of claim 1, wherein the orifice extends through the die wheel between two openings at the outer surface of the die wheel, the die wheel rotating adjacent a source of pressurized molten resin cyclically exposed to the orifice.

13. The method of claim 12, wherein the source of pressurized molten resin comprises an extrusion shoe forming a seal against the die wheel.

14. The method of claim 12, wherein the two openings are disposed on opposite sides of the die wheel.

15. The method of claim 12, wherein the two openings rotate within parallel planes spaced apart along a rotational axis of the die wheel, the orifice extending at an acute angle to the rotational axis.

16. The method of claim 1, wherein the orifice extends between an opening at an outer surface of the die wheel and an opening at an inner surface of the die wheel, the die wheel defining therein a reservoir containing pressurized, molten resin.

17. The method of claim 1, wherein the die wheel comprises a rotating sleeve disposed about a rotationally stationary cylinder defining an outer opening in hydraulic communication with the die wheel reservoir, the die wheel rotating to cyclically align the orifice and outer opening.

18. The method of claim 1, wherein the outer opening of the cylinder comprises a longitudinal slot.

19. The method of claim 1, further comprising adjusting a rotational orientation of the cylinder to position an extrusion orientation of the die wheel.

20. The method of claim 1, wherein the carrier sheet is trained about the rotating die wheel.

21. The method of claim 1, wherein the resin is wiped onto the carrier sheet from the outer surface of the rotating die wheel.

22. The method of 1, wherein the resin is transferred into the pressure nip by first being transferred from the outer surface of the die wheel to the outer surface of the mold roll, and then carried into the pressure nip by rotation of the mold roll.

23. The method of claim 1, wherein the resin is transferred into the pressure nip by first being transferred from the outer surface of the die wheel to an outer surface of the pressure roll, and then carried into the pressure nip by rotation of the pressure roll.

24. The method of claim 1, wherein the resin is laminated to the carrier sheet in the pressure nip, the carrier sheet being carried into the nip between the resin and the mold roll, pressure in the nip forcing the resin through the carrier sheet to fill the mold roll cavities.

25. The method of claim 1, further comprising forming engageable heads on distal ends of the fastener element stems.

26. The method of claim 25, wherein the mold roll cavities are shaped to mold the engageable heads.

27. The method of claim 25, wherein the heads are formed by deforming distal ends of the mold stems, after stripping the resin from the mold roll surface.

28. An apparatus for making fastener products having an array of male fastener elements formed of resin, the apparatus comprising:
a mold roll defining an array of cavities extending inwardly from an outer surface thereof;
a counter-rotating pressure roll positioned adjacent the mold roll to define a pressure nip;
a rotating die wheel defining an extrusion orifice in an outer surface thereof, the die wheel positioned so as to transfer extruded resin into the pressure nip in discrete regions corresponding to doses of resin extruded through the orifice, the discrete regions of resin being laminated to a carrier sheet and pressed into multiple cavities of the mold roll in the pressure nip to form at least the stems of the fastener elements, while forming a base of the resin on the surface of the mold roll, the base interconnecting the fastener element stems;
wherein the resin is carried into the pressure nip on the carrier sheet; and
wherein the carrier sheet passes through a nip defined between the die wheel and a counter-rotating roller.

29. A method of making fastener products having an array of male fastener elements formed of resin, the method comprising:
providing a mold roll defining an array of cavities extending inwardly from an outer surface thereof, the mold roll positioned adjacent a counter-rotating pressure roll to define a pressure nip;
extruding moldable resin as discrete doses through an orifice defined in an outer surface of a rotating die wheel, the extruding occurring at such a rate that the discrete doses at least partially merge;
transferring the extruded resin into the pressure nip in such a manner that the resin is transferred into the nip;
pressing the at least partially merged doses of resin into multiple cavities of the mold roll in the pressure nip to form at least the stems of the fastener elements, while forming a contiguous base of the resin on the surface of the mold roll, the base interconnecting the fastener element stems;
wherein the resin is carried into the pressure nip on the carrier sheet; and
wherein the carrier sheet passes through a nip defined between the die wheel and a counter-rotating roller.

30. The method of claim 29, further comprising laminating a carrier to the molten resin, the adjacent doses of resin forming a contiguous layer of resin.

31. The method of claim 29, wherein the extruding is done on the mold roll.

32. The method of claim 29, wherein the extruding is done on the pressure roll.

33. A method of making fastener products having an array of male fastener elements formed of resin, the method comprising:
providing a mold roll defining an array of cavities extending inwardly from an outer surface thereof, the mold roll positioned adjacent a counter-rotating pressure roll to define a pressure nip;
extruding moldable resin through an orifice defined in an outer surface of a rotatable die wheel while the die wheel is stationary;
transferring the extruded resin into the pressure nip;
pressing the regions of resin into multiple cavities of the mold roll in the pressure nip to form at least the stems of the fastener elements, while forming a base of the resin on the surface of the mold roll, the base interconnecting the fastener element stems; and
laminating the moldable resin to a carrier sheet;
wherein the resin is carried into the pressure nip on the carrier sheet; and
wherein the carrier sheet passes through a nip defined between the die wheel and a counter-rotating roller.

34. The method of claim 33, wherein the outer surface defines a plurality of orifices, producing a fastener product with discrete strips of fastener elements along a first direction upon the carrier sheet, the discrete strips being contiguous in a second direction that is perpendicular to the first direction.

35. The method of claim 33, wherein the resin falls through a distance onto the mold roll under the influence of gravity.

36. The method of claim 35, wherein the distance is from about 0.5 inch to about 36 inch.

37. A method of making fastener products having an array of male fastener elements formed of resin, the method comprising:
providing a mold roll defining an array of cavities extending inwardly from an outer surface thereof, the mold roll positioned adjacent a counter-rotating pressure roll to define a pressure nip;
extruding moldable resin in discrete doses through an orifice defined in an outer surface of a rotating die wheel;
transferring the extruded resin into the pressure nip in such a manner that the resin is transferred into the nip in discrete regions corresponding to the doses of extruded resin;
laminating the moldable resin to a carrier sheet;
pressing the regions of resin into multiple cavities of the mold roll in the pressure nip to form at least the stems of the fastener elements, while forming a base of the resin on the surface of the mold roll, the base interconnecting the fastener element stems; and
stripping the resin from the mold roll surface on the carrier sheet;
wherein the orifice extends through the die wheel between two openings at the outer surface of the die wheel, the die wheel rotating adjacent a source of pressurized molten resin cyclically exposed to the orifice; and
wherein the two openings rotate within parallel planes spaced apart along a rotational axis of the die wheel.

38. The method of claim 37, wherein the resin is transferred as a series of discrete regions spaced apart according to revolutions of the die wheel.

39. The method of claim 37, wherein the resin is transferred as a multiple number of regions per revolution of the die wheel.

40. The method of claim 37, wherein the die wheel defines multiple extrusion orifices.

41. The method of claim 37, wherein the extrusion orifices are spaced apart along a rotational axis of the die wheel.

42. The method of claim 37, wherein the extrusion orifices are spaced apart about a circumference of the die wheel, such that multiple discrete regions of resin are transferred per revolution of the die wheel.

43. The method of claim 37, wherein the resin is extruded at such a rate that causes adjacent doses of resin to merge on the carrier sheet.

44. The method of claim 43, wherein the adjacent doses merge under nip pressure to form the base as a contiguous layer of resin.

45. The method of claim 37, wherein the multiple extrusion orifices are arranged adjacent one another in a grouping, such that doses of resin from the orifices in the grouping are transferred into the pressure nip in a pattern of an overall shape determined by a shape of the grouping of orifices in the die wheel.

46. The method of claim 45, wherein the adjacent doses of resin in the transferred pattern merge to fill the overall pattern shape with a contiguous layer of resin.

47. The method of claim 37, wherein the orifice is elongated at the outer surface of the die wheel.

48. The method of claim 37, wherein the source of pressurized molten resin comprises an extrusion shoe forming a seal against the die wheel.

49. The method of claim 37, wherein the two openings are disposed on opposite sides of the die wheel.

50. The method of claim 37, wherein the orifice extends between an opening at an outer surface of the die wheel and an opening at an inner surface of the die wheel, the die wheel defining therein a reservoir containing pressurized, molten resin.

51. The method of claim 37, wherein the die wheel comprises a rotating sleeve disposed about a rotationally stationary cylinder defining an outer opening in hydraulic communication with the die wheel reservoir, the die wheel rotating to cyclically align the orifice and outer opening.

52. The method of claim 37, wherein the outer opening of the cylinder comprises a longitudinal slot.

53. The method of claim 37, further comprising adjusting a rotational orientation of the cylinder to position an extrusion orientation of the die wheel.

54. The method of claim 37, wherein the carrier sheet is trained about the rotating die wheel.

55. The method of claim 37, wherein the resin is wiped onto the carrier sheet from the outer surface of the rotating die wheel.

56. The method of claim 37, wherein the resin is transferred into the pressure nip by first being transferred from the outer surface of the die wheel to the outer surface of the mold roll, and then carried into the pressure nip by rotation of the mold roll.

57. The method of claim 37, wherein the resin is transferred into the pressure nip by first being transferred from the outer surface of the die wheel to an outer surface of the pressure roll, and then carried into the pressure nip by rotation of the pressure roll.

58. The method of claim 37, wherein the resin is laminated to the carrier sheet in the pressure nip, the carrier sheet being carried into the nip between the resin and the mold roll, pressure in the nip forcing the resin through the carrier sheet to fill the mold roll cavities.

59. The method of claim 37, further comprising forming engageable heads on distal ends of the fastener element stems.

60. The method of claim 59, wherein the mold roll cavities are shaped to mold the engageable heads.

61. The method of claim 59, wherein the heads are formed by deforming distal ends of the mold stems, after stripping the resin from the mold roll surface.

\* \* \* \* \*